(12) United States Patent
Nakagawa et al.

(10) Patent No.: US 11,935,568 B2
(45) Date of Patent: Mar. 19, 2024

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/164,120

(22) Filed: Feb. 3, 2023

(65) Prior Publication Data
US 2023/0386510 A1 Nov. 30, 2023

(30) Foreign Application Priority Data
May 27, 2022 (JP) .................................. 2022-086542

(51) Int. Cl.
*G11B 5/00* (2006.01)
*G11B 5/31* (2006.01)
(52) U.S. Cl.
CPC ............ *G11B 5/3146* (2013.01); *G11B 5/314* (2013.01); *G11B 2005/0024* (2013.01)
(58) Field of Classification Search
CPC ........... G11B 17/34; G11B 5/012; G11B 5/09; G11B 5/59627; G11B 5/3503; G11B 5/40;
(Continued)

(56) References Cited

U.S. PATENT DOCUMENTS 7,110,198 B1 * 9/2006 Aram ................. H03K 17/0414
360/68
7,616,412 B2 11/2009 Zhu et al.
(Continued)

FOREIGN PATENT DOCUMENTS

JP 2008-277586 A 11/2008
JP 2009-64499 A 3/2009
(Continued)

*Primary Examiner* — Nabil Z Hindi
(74) *Attorney, Agent, or Firm* — Oblon, McClelland, Maier & Neustadt, L.L.P.

(57) ABSTRACT

According to one embodiment, a magnetic recording device includes a magnetic head and a controller. The magnetic head includes first and second magnetic poles, a magnetic element provided between the first magnetic pole and the second magnetic pole, first and second terminals electrically connected to one end and another end of the magnetic element, respectively, and a coil. The controller is electrically connected to the magnetic element and the coil, and performs a recording operation. In the recording operation, the controller supplies a recording current to the coil while applying an element voltage between the first and second terminals. When the applied voltage is changed while the recording current is supplied, a differential resistance of the magnetic element becomes a first differential resistance peak when the applied voltage is a first voltage, and becomes a second differential resistance peak when the applied voltage is a second voltage.

20 Claims, 15 Drawing Sheets

(58) Field of Classification Search
CPC ......... G11B 5/54; G11B 5/4907; G11B 5/332; G11B 2005/0021; G11B 2005/0005; G11B 5/314; G11B 20/1419; G11B 2220/90; G11B 19/20
USPC .......................................................... 360/59
See application file for complete search history.

(56) References Cited

U.S. PATENT DOCUMENTS

| | | |
|---|---|---|
| 9,064,508 B1 | 6/2015 | Shiimoto et al. |
| 11,043,232 B1 | 6/2021 | Wu |
| 2008/0268291 A1 | 10/2008 | Akiyama et al. |
| 2009/0052095 A1 | 2/2009 | Yamada et al. |
| 2009/0059417 A1 | 3/2009 | Takeo et al. |
| 2012/0176702 A1 | 7/2012 | Yamada et al. |
| 2022/0005497 A1 | 1/2022 | Takagishi et al. |
| 2022/0084551 A1 | 3/2022 | Koizumi |
| 2022/0270641 A1 | 8/2022 | Nakagawa et al. |

FOREIGN PATENT DOCUMENTS

| | | |
|---|---|---|
| JP | 4358279 B2 | 11/2009 |
| JP | 2012-146351 A | 8/2012 |
| JP | 2022-12263 A | 1/2022 |
| JP | 2022-50037 A | 3/2022 |
| JP | 2022-129730 A | 9/2022 |

* cited by examiner

MAGNETIC RECORDING DEVICE

CROSS-REFERENCE TO RELATED APPLICATIONS

This application is based upon and claims the benefit of priority from Japanese Patent Application No. 2022-086542, filed on May 27, 2022; the entire contents of which are incorporated herein by reference.

FIELD

Embodiments described herein relate generally to a magnetic recording device.

BACKGROUND

Information is recorded on a magnetic recording medium such as an HDD (Hard Disk Drive) using a magnetic head. It is desired to improve the recording density in the magnetic recording device.

DETAILED DESCRIPTION

Figure 1:
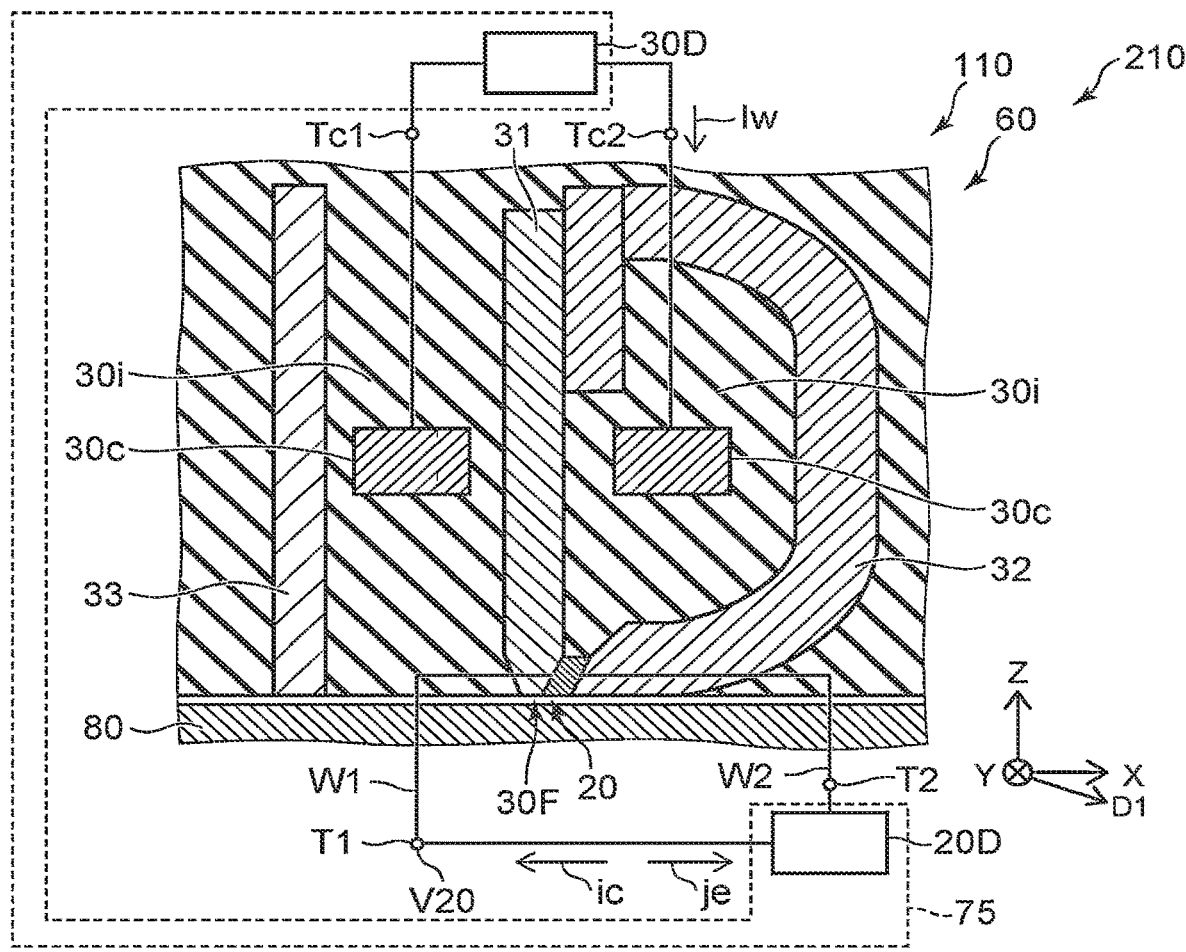
FIG. 1 is a schematic cross-sectional view illustrating a magnetic recording device according to a first embodiment.

According to one embodiment, a magnetic recording device includes a magnetic head and a controller. The magnetic head includes a first magnetic pole, a second magnetic pole, a magnetic element provided between the first magnetic pole and the second magnetic pole, a first terminal electrically connected to one end of the magnetic element, a second terminal electrically connected to another end of the magnetic element, and a coil. The controller is electrically connected to the magnetic element and the coil. The controller is configured to perform a recording operation. In the recording operation, the controller is configured to supply a recording current to the coil while applying an element voltage between the first terminal and the second terminal. When an applied voltage applied between the first terminal and the second terminal is changed while the recording current is supplied to the coil, a differential resistance of the magnetic element becomes a first differential resistance peak when the applied voltage is a first voltage. The differential resistance becomes a second differential resistance peak when the applied voltage is a second voltage. The second voltage is higher than the first voltage. The element voltage is higher than the first voltage and lower than the second voltage.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording device according to the first embodiment.

As shown in FIG. 1, a magnetic recording device 210 according to the embodiment includes a magnetic head 110 and a controller 75. The magnetic recording device 210 may include a magnetic recording medium 80. At least a recording operation is performed in the magnetic recording device 210. In the recording operation, information is recorded on the magnetic recording medium 80 using the magnetic head 110.

The magnetic head 110 includes a recording part 60. As will be described later, the magnetic head 110 may include a reproducing part. The recording part 60 includes a first magnetic pole 31, a second magnetic pole 32, a magnetic element 20 and a coil 30c. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, the main pole. The second magnetic pole 32 is, for example, a trailing shield. The first magnetic pole 31 may be the trailing shield and the second magnetic pole 32 may be the main pole.

A direction from the magnetic recording medium 80 to the magnetic head 110 is defined as a Z-axis direction. One direction perpendicular to the Z-axis direction is defined as an X-axis direction. The direction perpendicular to the Z-axis direction and the X-axis direction is defined as the Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A recording magnetic field generated by the magnetic head 110 is applied to a desired position on the magnetic recording medium 80. Magnetization at a desired position of the magnetic recording medium 80 is controlled in a direction according to the recording magnetic field. Information is thus recorded on the magnetic recording medium 80.

A direction from the first magnetic pole 31 to the second magnetic pole 32 is defined as a first direction D1. The first direction D1 is substantially along the X-axis direction. In embodiments, the first direction D1 may be inclined with respect to the X-axis direction. The angle of inclination is, for example, more than 0 degrees and not more than 10 degrees.

In this example, a part of coil 30c is located between the first magnetic pole 31 and the second magnetic pole 32. In this example, a shield 33 is provided. The first magnetic pole 31 is located between the shield 33 and the second magnetic pole 32 in the X-axis direction. Another portion of coil 30c is located between shield 33 and first pole 31. An insulating portion 30i is provided between these multiple elements. The shield 33 is, for example, a leading shield. The magnetic head 110 may also include side shields (not shown).

As shown in FIG. 1, a recording current Iw is supplied from the recording circuit 30D to the coil 30c. For example, a first coil terminal Tc1 and a second coil terminal Tc2 are provided on the coil 30c. The recording current Iw is supplied to the coil 30c through these coil terminals. The recording magnetic field corresponding to the recording current Iw is applied to the magnetic recording medium 80 from the first magnetic pole 31.

As shown in FIG. 1, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F is, for example, along the X-Y plane.

As shown in FIG. 1, an element circuit 20D is electrically connected to the magnetic element 20. In this example, the magnetic element 20 is electrically connected to the first magnetic pole 31 and the second magnetic pole 32. In the magnetic head 110, is a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D.

As shown in FIG. 1, the element current ic has an orientation from the first magnetic pole 31 to the second magnetic pole 32. As shown in FIG. 1, electron flow je associated with the element current ic has an orientation from the second magnetic pole 32 to the first magnetic pole 31.

For example, when the element current ic not less than a threshold value flows through the magnetic element 20, oscillation occurs in the magnetic layer included in the magnetic element 20. The magnetic element 20 functions, for example, as an STO (Spin-Torque Oscillator). An alternating magnetic field (for example, a high-frequency magnetic field) is generated from the magnetic element 20 associated with the oscillation. The alternating magnetic field generated by the magnetic element 20 is applied to the magnetic recording medium 80 to assist the recording on the magnetic recording medium 80. For example, MAMR (Microwave Assisted Magnetic Recording) can be performed.

The recording circuit 30D and the element circuit 20D are included in the controller 75. The controller 75 is electrically connected to the magnetic element 20 and the coil 30c. The controller 75 can supply the recording current 1w to the coil 30c and supply the element current ic to the magnetic element 20.

For example, the controller 75 (the element circuit 20D) applies an element voltage V20 corresponding to the element current ic between the first terminal T1 and the second terminal T2. Practically, the element current ic may be controlled by controlling the element voltage V20. The element voltage V20 corresponds to, for example, the potential of the first terminal T1 based on the potential of the second terminal T2. The wiring resistance between these terminals and the magnetic element 20 is substantially constant. A voltage difference between the element voltage V20 and the voltage drop in the wiring is applied to the magnetic element 20. The change in the voltage applied to the magnetic element 20 corresponds to the change in the element voltage V20. For example, when the characteristics of the magnetic element 20 based on the applied voltage are considered, it may be thought that the voltage applied between the first terminal T1 and the second terminal T2 (the element voltage V20) is substantially applied to the magnetic element 20. For example, the rate of change in the element voltage V20 is substantially the same as the rate of change in the voltage applied to the magnetic element 20.

As described above, in the recording operation, the controller 75 supplies the recording current Iw to the coil 30c while applying the element voltage V20 between the first terminal T1 and the second terminal T2. As described above, the alternating magnetic field is generated from the magnetic element 20 to which the voltage corresponding to the element voltage V20 is applied. In the recording operation, the alternating magnetic field is generated from the magnetic element 20. Examples of the element voltage V20 (and the element current ic) in the embodiment will be described later.

An example of the characteristics of the magnetic head 110 according to the embodiment will be described below.

Figure 2:
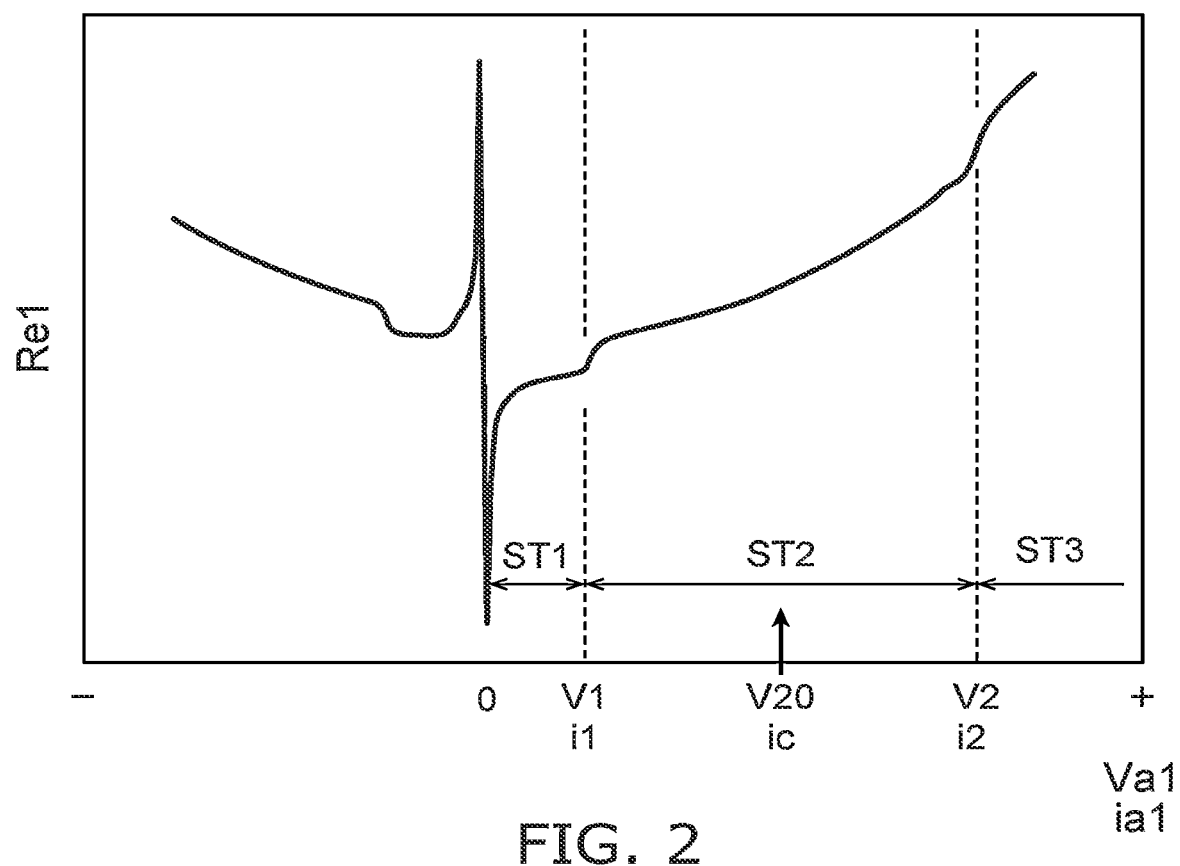
FIG. 2 is a schematic diagram illustrating characteristics of the magnetic recording apparatus according to the first embodiment.

FIG. 2 is a schematic diagram illustrating characteristics of the magnetic recording apparatus according to the first embodiment.

The horizontal axis in FIG. 2 is an applied voltage Va1 applied by the controller 75 (the element circuit 20D) between the first terminal T1 and the second terminal T2. The applied voltage Va1 corresponds to the voltage applied to the magnetic element 20. The horizontal axis of FIG. 2 corresponds to the supply current ia1 supplied to the magnetic element 20. The supply current ia1 corresponds to the current flowing between the first terminal T1 and the second terminal T2. The vertical axis in FIG. 2 is the electrical resistance Re1 of the magnetic element 20. The product of the electrical resistance Re1 and the supply current ia1 corresponds to the applied voltage Va1. As described later, the magnetic element 20 oscillates at a specific applied voltage Va1 (and the specific supply current ia1). An alternating magnetic field is generated from the magnetic element 20. The electrical resistance of the magnetic element changes (oscillates) corresponding to the oscillation. In FIG. 2, the change associated with the oscillation of the electrical resistance Re1 is shown by averaging. The electrical resistance Re1 in FIG. 2 is the time-averaged electrical resistance of the magnetic element 20. In FIG. 2, the electrical resistance Re1 is a measurement result of a time average. The electrical resistance Re1 in FIG. 2 is a DC resistance.

FIG. 2 illustrates a change in the electrical resistance Re1 of the magnetic element 20 when the applied voltage Va1 applied between the first terminal T1 and the second terminal T2 is changed while the recording current Iw is supplied to the coil 30c. When the applied voltage Va1 is positive, the change in the applied voltage Va1 may be, for example, an increase from 0 volts.

As shown in FIG. 2, the electrical resistance Re1 increases in response to an increase in the absolute value of the applied voltage Va1. Hereinafter, a region where the applied voltage Va1 is positive will be described. In the region where the applied voltage Va1 is positive, the orientation of the element current is flowing through the magnetic element 20 is from the first magnetic pole 31 to the second magnetic pole 32. When the applied voltage Va1 is positive, for example, the potential of the first magnetic pole 31 is higher than the potential of the second magnetic pole 32.

For example, in the region where the absolute value of the applied voltage Va1 is small, the electrical resistance Re1 rapidly decreases or rapidly increases. This phenomenon may be related to, for example, the voltage generated by the thermoelectric effect in the magnetic element 20. This rapid decrease or increase can be eliminated by correcting the applied voltage Va1 when deriving the electrical resistance Re1. A voltage from which the voltage generated by the thermoelectric effect is removed is obtained from the applied voltage Va1. A ratio of the voltage from which the voltage generated by the thermoelectric effect is removed, to the supply current ia1 is obtained. By the ratio being obtained, the electrical resistance Re1 from which the rapid decrease or increase being removed is obtained. The value of the voltage produced by the thermoelectric effect is estimated so as to appropriately exclude a rapid decrease or increase in the electrical resistance Re1. In the differential resistance measurement described below, this rapid decrease or increase does not substantially occur.

For example, when the applied voltage Va1 being positive increases, the electrical resistance Re1 substantially increases as a function of the square of the applied voltage Va1. This may be related to an increase in temperature caused by Joule heat due to the current flowing through the magnetic element 20.

Further, as shown in FIG. 2, when the applied voltage Va1 is the first voltage V1, the electrical resistance Re1 changes in a discontinuous stepwise manner. In this example, when the applied voltage Va1 is the second voltage V2, the electrical resistance Re1 changes discontinuously in a stepwise manner. The second voltage V2 is higher than the first voltage V1.

In a state where the recording current Iw is supplied to the coil 30c, for example, a DC applied voltage Va1 (and a DC supplied current ia1) is supplied to the magnetic element 20. At this time, a high-frequency signal (For example, alternating signals) generated from the magnetic element 20 can be extracted. The high-frequency signal can be taken out from the first terminal T1 or the second terminal T2. The high-frequency signal can be taken out, for example, as a product of an alternating current and an alternating voltage. The high-frequency signal is, for example, alternating power. For example, by taking out the high-frequency signal from the vicinity of the first terminal T1 or the second terminal T2, the high-frequency signal is obtained in a state of small attenuation. The extracted high-frequency signal is considered to be associated with the oscillation of the electrical resistance Re1 of the magnetic element 20.

When a high-frequency signal is generated, an alternating magnetic field is generated. The frequency of the high-frequency signal corresponds to the frequency of the alternating magnetic field generated from the magnetic layer in the magnetic element 20. The intensity of the high-frequency signal corresponds to the intensity of the alternating magnetic field generated from the magnetic layer in the magnetic element 20. When the magnetic layer does not oscillate, a high-frequency signal is substantially not obtained.

The region where the applied voltage Va1 is not less than 0 volts and less than the first voltage V1 corresponds to a first state ST1. In the first state ST1, the high-frequency signal is substantially not obtained from the magnetic element 20. For example, in the first state ST1, the electrical resistance Re1 does not change in oscillation-like.

The region where the applied voltage Va1 is higher than the first voltage V1 and less than the second voltage V2 corresponds to a second state ST2. In the second state ST2, the high-frequency signal is obtained from the magnetic element 20. For example, in the second state ST2, the electrical resistance Re1 changes in oscillation-like. In the second state ST2, an alternating magnetic field (high-frequency magnetic field) is generated from the magnetic element 20.

A region where the applied voltage Va1 is higher than the second voltage V2 corresponds to a third state ST3. In the third state ST3, a high-frequency signal is obtained from the magnetic element 20. For example, in the third state ST3, the electrical resistance Re1 changes in oscillation manner. As will be described later, the oscillation state in the third state ST3 is different from the oscillation state in the second state ST2. In the third state ST3, an alternating magnetic field (high-frequency magnetic field) in another state is generated from the magnetic element 20.

At the first voltage V1, the transition between the first state ST1 and the second state ST2 occurs. At the second voltage V2, the transition between the second state ST2 and the third state ST3 occurs.

The region where the supply current ia1 is not less than 0 and less than the first current i1 corresponds to the first state ST1. In the first state ST1, a high-frequency signal is substantially not obtained from the magnetic element 20. For example, in the first state ST1, the electrical resistance Re1 does not change in oscillation manner.

The region where the supply current ia1 is higher than the first current i1 and lower than the second current i2 corresponds to the second state ST2. In the second state ST2, a high-frequency signal is obtained from the magnetic element 20. For example, in the second state ST2, the electrical resistance Re1 changes in oscillation manner. In the second state ST2, an alternating magnetic field (high-frequency magnetic field) is generated from the magnetic element 20.

The region where the supply current ia1 is higher than the second current i2 corresponds to the third state ST3. In the third state ST3, a high-frequency signal is obtained from the magnetic element 20. In the third state ST3, the electrical resistance Re1 changes in oscillation manner. In the third state ST3, an alternating magnetic field (high-frequency magnetic field) in another state is generated from the magnetic element 20.

At the first current i1, the transition between the first state ST1 and the second state ST2 occurs. At the second current i2, the transition between the second state ST2 and the third state ST3 occurs.

Figure 3A:
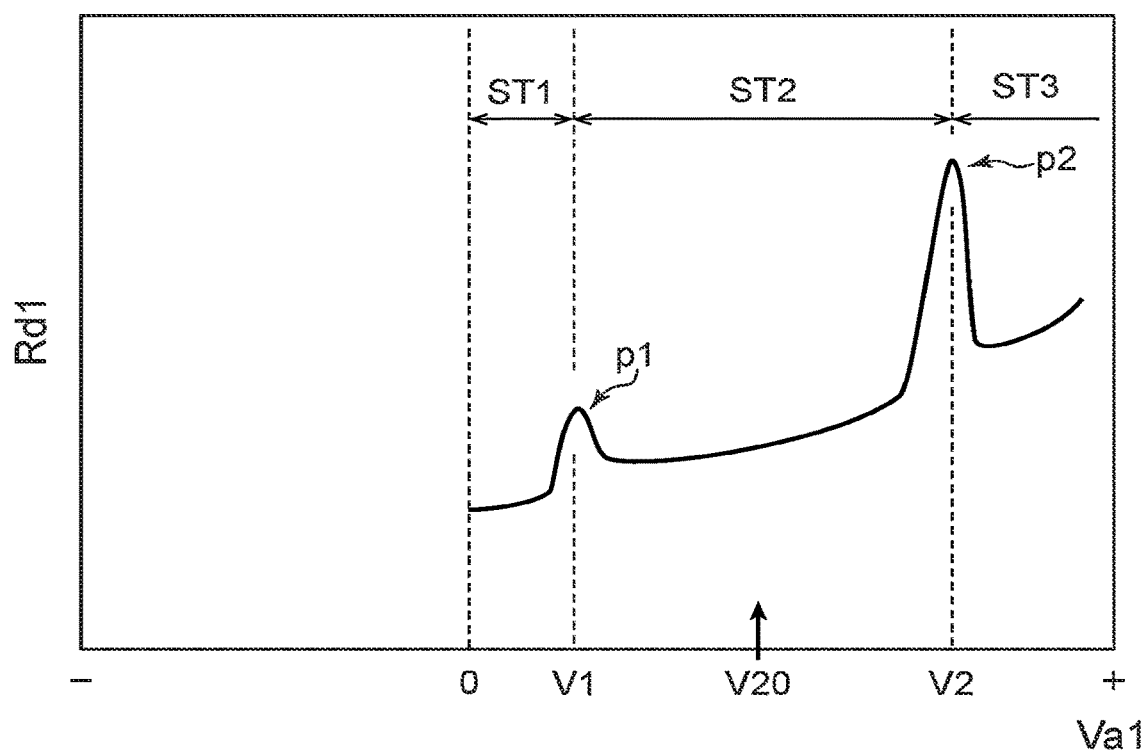
FIGS. 3A and 3B are schematic diagrams illustrating characteristics of the magnetic recording apparatus according to the first embodiment.
Figure 3B:
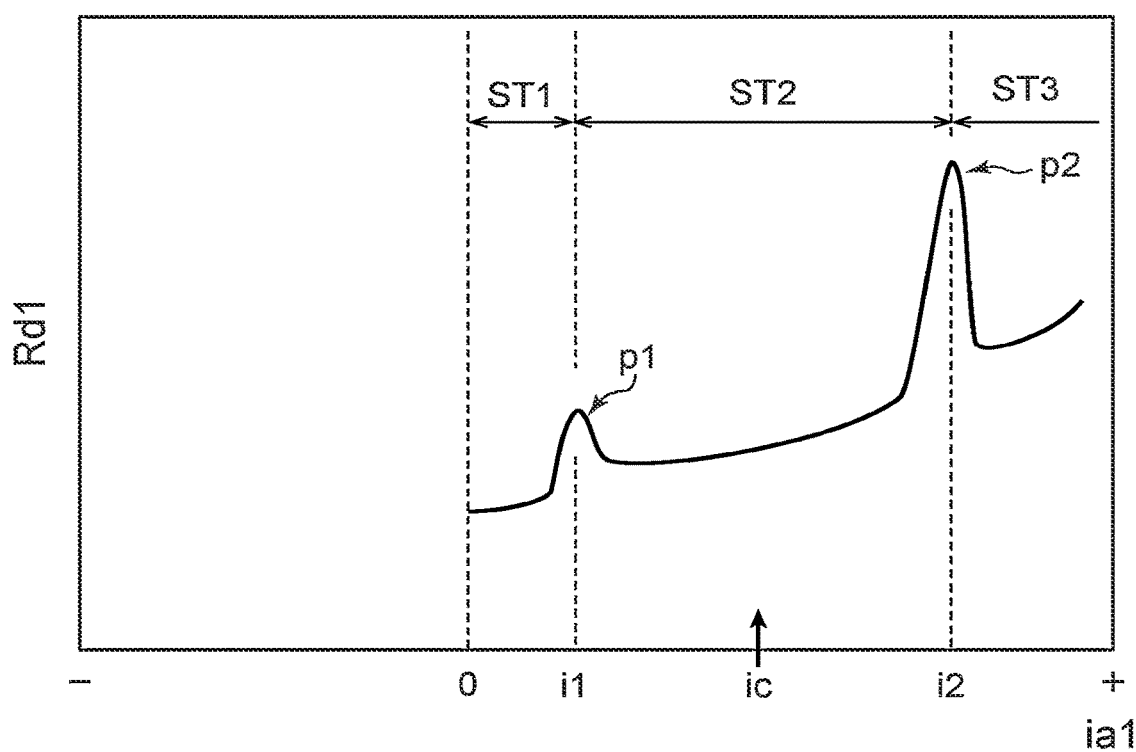

FIGS. 3A and 3B are schematic diagrams illustrating characteristics of the magnetic recording apparatus according to the first embodiment.

The horizontal axis of FIG. 3A is the applied voltage Va1. The horizontal axis of FIG. 3B is the supply current ia1. The vertical axis of FIGS. 3A and 3B is the differential resistance Rd1 of the magnetic element 20. The differential resistance Rd1 is the ratio of the minute change d(Va1) of the applied voltage Va1 to the minute change d(ia1) of the supply current ia1. The differential resistance Rd1 is, for example, d(Va1)/d(ia1). The characteristics in these figures are the characteristics when the recording current Iw is supplied to the coil 30c. For example, the differential resistance Rd1 corresponds to the differential resistance of the magnetic element 20 when the applied voltage Va1 is changed while the recording current Iw is supplied to the coil 30c. The recording current Iw is a current flowing through the coil 30c in the recording operation. The orientation (polarity) of the recording current Iw changes depending on the information to be recorded. In the following example, the orientation (polarity) of the recording current Iw is such that a magnetic field including a component of the orientation from the second magnetic pole 32 to the first magnetic pole 31 is generated.

As shown in FIG. 3A, the differential resistance Rd1 of the magnetic element 20 becomes a first differential resistance peak p1 when the applied voltage Va1 is the first voltage V1. The differential resistance Rd1 becomes a second differential resistance peak p2 when the applied voltage Va1 is the second voltage V2. The second voltage V2 is higher than the first voltage V1. In the embodiment, the element voltage V20 applied in the recording operation is higher than the first voltage V1 and less than the second voltage V2.

By such the element voltage V20, an appropriate alternating magnetic field can be obtained. MAMR can be performed appropriately. According to the embodiment, a magnetic recording apparatus capable of improving recording density can be provided.

As shown in FIG. 3B, the differential resistance Rd1 of the magnetic element 20 becomes the first differential resistance peak p1 when the supply current ia1 supplied to the magnetic element 20 is the first current i1. The differential resistance Rd1 becomes the second differential resistance peak p2 when the supply current ia1 is the second current i2. The second current i2 is larger than the first current i1. In the embodiment, in the recording operation, the element current ic is larger than the first current i1 and smaller than the second current i2.

By such the element current ic, an appropriate alternating magnetic field can be obtained. MAMR can be performed appropriately. According to the embodiment, a magnetic recording apparatus capable of improving recording density can be provided.

As described above, the second state ST2 corresponds to a case where the applied voltage Va1 is higher than the first voltage V1 and lower than the second voltage V2. In the second state ST2, an alternating magnetic field is generated from the magnetic element 20. The first state ST1 corresponds to a case where the applied voltage Va1 is lower than the first voltage V1. In the first state ST1, the alternating magnetic field described above is not generated from the magnetic element 20. The first voltage V1 corresponds to a threshold value for oscillation.

In the embodiment, the frequency of the alternating magnetic field is, for example, from 10 GHz to 40 GHz. In the embodiment, in the recording operation, the potential of the first magnetic pole 31 is higher than the potential of the second magnetic pole 32. In the recording operation, the element current is in the orientation from the first magnetic pole 31 to the second magnetic pole 32 flows to the magnetic element 20. When a current from the second magnetic pole 32 to the first magnetic pole 31 flows to the magnetic element 20 while the recording current Iw is supplied to the coil 30c (In FIG. 2, when the supply current ia1 is negative), the alternating magnetic field generated in the recording operation is not generated.

The high-frequency signal can be easily observed by changing, for example, the current supplied to the coil 30c. For example, information on the alternating magnetic field during the recording operation can be easily obtained from the change in the high-frequency signal in response to the change in the current supplied to the coil 30c. For example, by applying a DC magnetic field from the outside, a high-frequency signal can be easily observed. From the change of the high-frequency signal in response to the change of the DC magnetic field, information on the alternating magnetic field during the recording operation can be easily obtained.

When an alternating electromagnetic force is applied to the magnetic element 20 while supplying the DC applied voltage Va1 (and the DC supplied current ia1), the electrical resistance Re1 changes according to the state of the magnetic element 20. The alternating electromagnetic force is, for example, an alternating magnetic field applied from the outside. The alternating electromagnetic force is, for example, a high-frequency signal supplied from the first terminal T1 or the second terminal T2 to the magnetic element 20.

Figure 4:
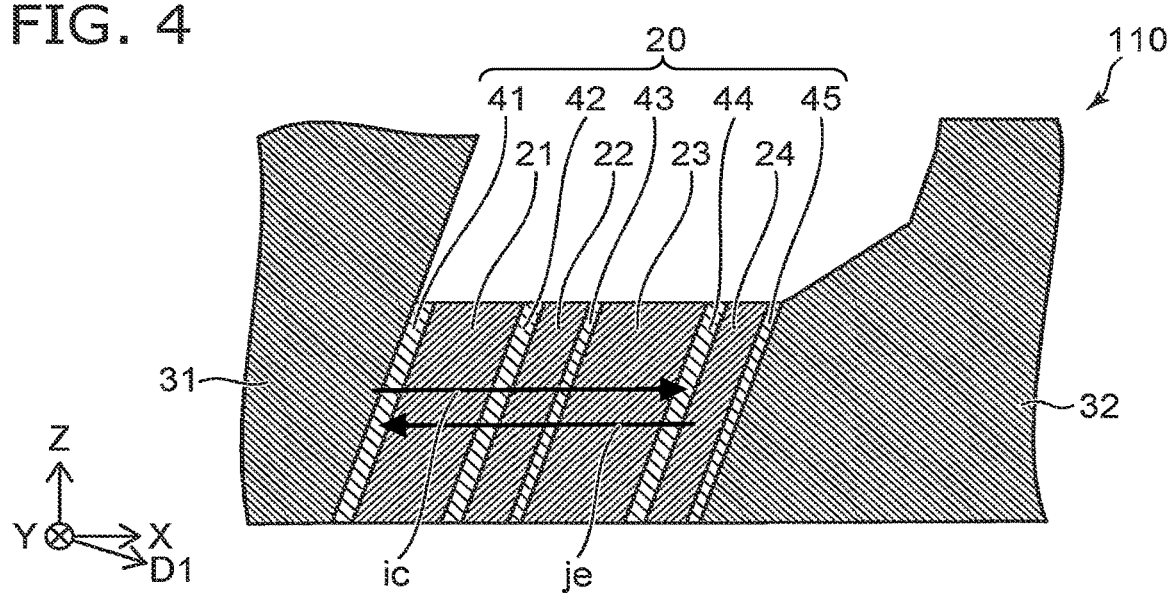
FIG. 4 is a schematic cross-sectional view illustrating a part of the magnetic recording apparatus according to the first embodiment.

FIG. 4 is a schematic cross-sectional view illustrating a part of the magnetic recording apparatus according to the first embodiment.

Figure 5:
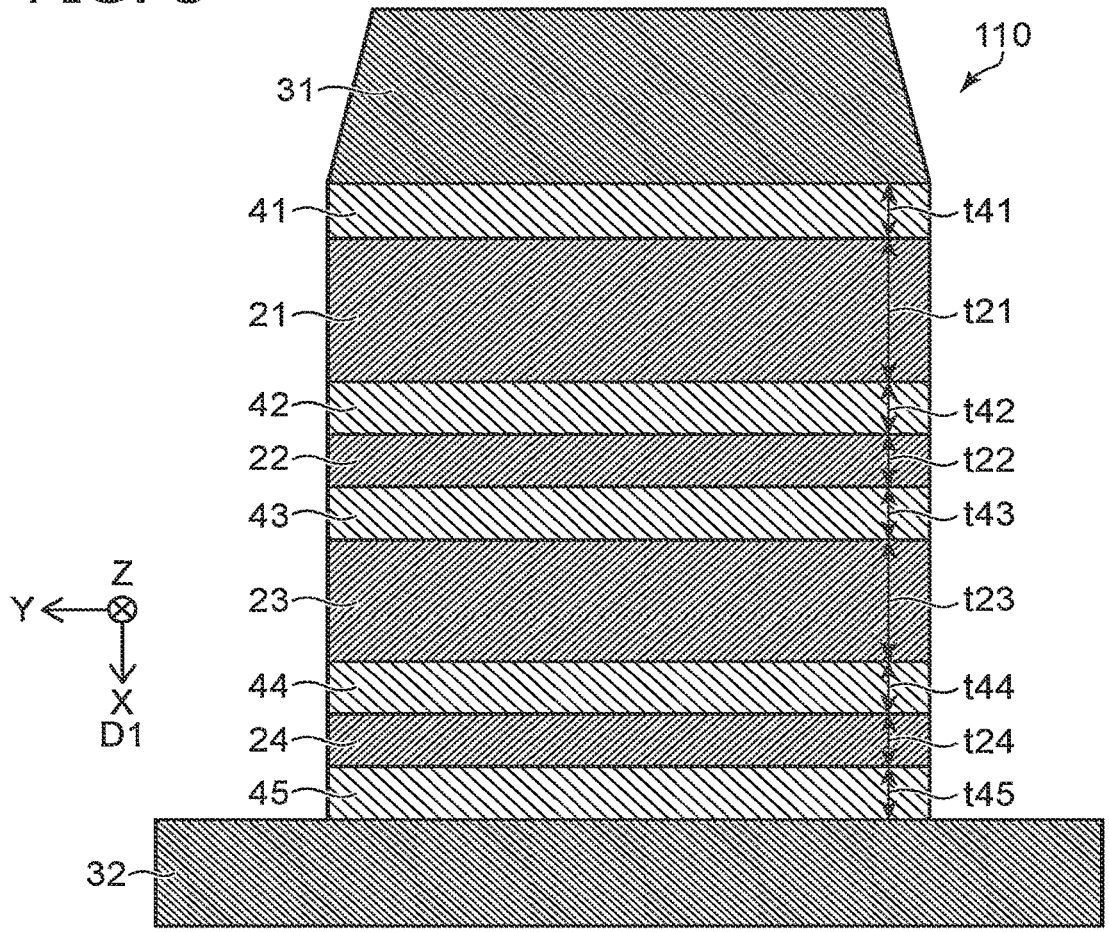
FIG. 5 is a schematic plan view illustrating the part of the magnetic recording apparatus according to the first embodiment.

FIG. 5 is a schematic plan view illustrating the part of the magnetic recording apparatus according to the first embodiment.

As shown in FIG. 4, the magnetic element 20 includes a first magnetic layer 21, a second magnetic layer 22, a third magnetic layer 23, and a fourth magnetic layer 24. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

The magnetic element 20 includes a first non-magnonmagnetic layer 41, a second non-magnetic layer 42, a third non-magnetic layer 43, a fourth non-magnetic layer 44, and a fifth non-magnetic layer 45. The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the second magnetic pole 32.

As shown in FIG. 5, in the magnetic head 110, the first magnetic layer 21 and the third magnetic layer 23 are thicker than the second magnetic layer 22 and the fourth magnetic layer 24.

A direction from the first magnetic pole 31 to the second magnetic pole 32 is defined as a first direction D1. The thickness of the first magnetic layer 21 along the first direction D1 is defined as a first thickness t21. The thickness of the second magnetic layer 22 along the first direction D1 is defined as the second thickness t22. The thickness of the third magnetic layer 23 along the first direction D1 is defined as the third thickness t23. The thickness of the fourth magnetic layer 24 along the first direction D1 is defined as a fourth thickness t24.

In the magnetic head 110, the first thickness t21 is thicker than the second thickness t22. The first thickness t21 is thicker than the fourth thickness t24. The third thickness t23 is thicker than the second thickness t22. The third thickness t23 is thicker than the fourth thickness t24.

The first magnetic layer 21 and the third magnetic layer 23 are, for example, oscillation layers. The second magnetic layer 22 and the fourth magnetic layer 24 are, for example, spin injection layers.

In the magnetic head 110, for example, the first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt, and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt, and W.

In a first material including at least one selected from the group consisting of Ru, Ir, Ta, Rh, Pd, Pt and W, spin is hardly permeable. In a second material including at least one selected from the group consisting of Cu, Au, Cr, V, Al and Ag, spin is easily permeable.

In the magnetic head 110, the plurality of states described with respect to FIGS. 2, 3A and 3B correspond to changes in the state of magnetization of the magnetic layer. An example of the state of magnetization will be described below.

FIGS. 6A to 6D are schematic diagrams illustrating operations in the magnetic recording apparatus according to the first embodiment.

Figure 6A:
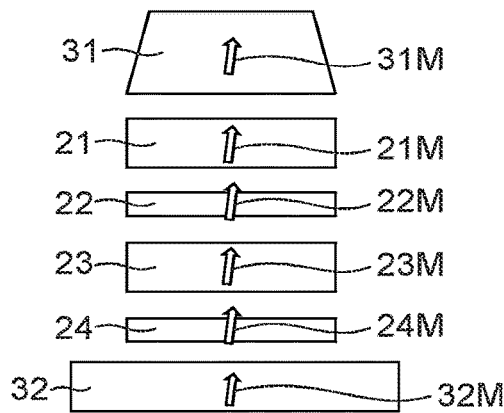
FIGS. 6A to 6D are schematic diagrams illustrating operations in the magnetic recording apparatus according to the first embodiment.

As shown in FIG. 6A, in one example, in the first state ST1, the magnetization 31M of the first magnetic pole 31 and the magnetization 32M of the second magnetic pole 32 are "upward". "Upward" corresponds to the orientation from the second magnetic pole 32 to the first magnetic pole 31. In the first state ST1, the magnetization 21M of the first magnetic layer 21, the magnetization 22M of the second magnetic layer 22, the magnetization 23M of the third magnetic layer 23, and the magnetization 24M of the fourth magnetic layer 24 are "upward". "Upward" corresponds to the orientation from the second magnetic pole 32 to the first magnetic pole 31. In the examples of FIGS. 6A to 6D, the orientation (polarity) of the recording current Iw is the orientation corresponding to "upward".

Figure 6B:
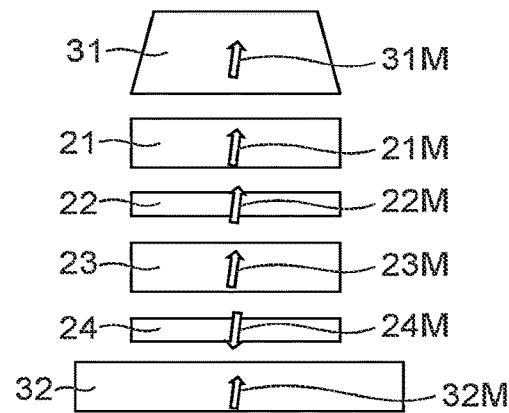

As shown in FIG. 6B, when the applied voltage Va1 is the first voltage V1, the magnetization 24M of the fourth magnetic layer 24 is reversed.

Figure 6C:
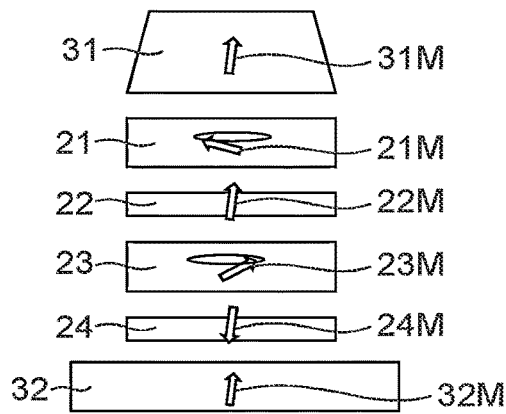

As shown in FIG. 6C, in the second state ST2, the magnetization 21M of the first magnetic layer 21 and the magnetization 23M of the third magnetic layer 23 oscillate. Thereby, an alternating magnetic field is generated from the magnetic element 20. The magnetization 21M and the magnetization 23M oscillate in opposite phases. For example, the phase difference between the Y-axis direction component of the magnetization 21M and the Y-axis direction component of the magnetization 23M is 160 degrees to 200 degrees. In the second state ST2, a stable oscillation frequency is obtained by the oscillations in the opposite phase. Appropriate MAMR can be performed.

Figure 6D:
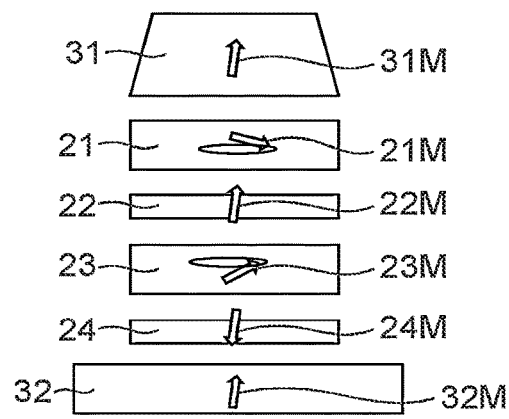

As shown in FIG. 6D, in the third state ST3, the magnetization 21M of the first magnetic layer 21 and the magnetization 23M of the third magnetic layer 23 oscillate. In the third state ST3, the oscillation in these magnetic layers is different from the opposite phase. For example, the oscillation frequency of the magnetization 21M is different from the oscillation frequency of the magnetization 23M. In the third state ST3, appropriate MAMR is difficult due to the oscillations different from the opposite phase.

An example of the simulation result of the magnetic head 110 will be described below.

Figure 7A:
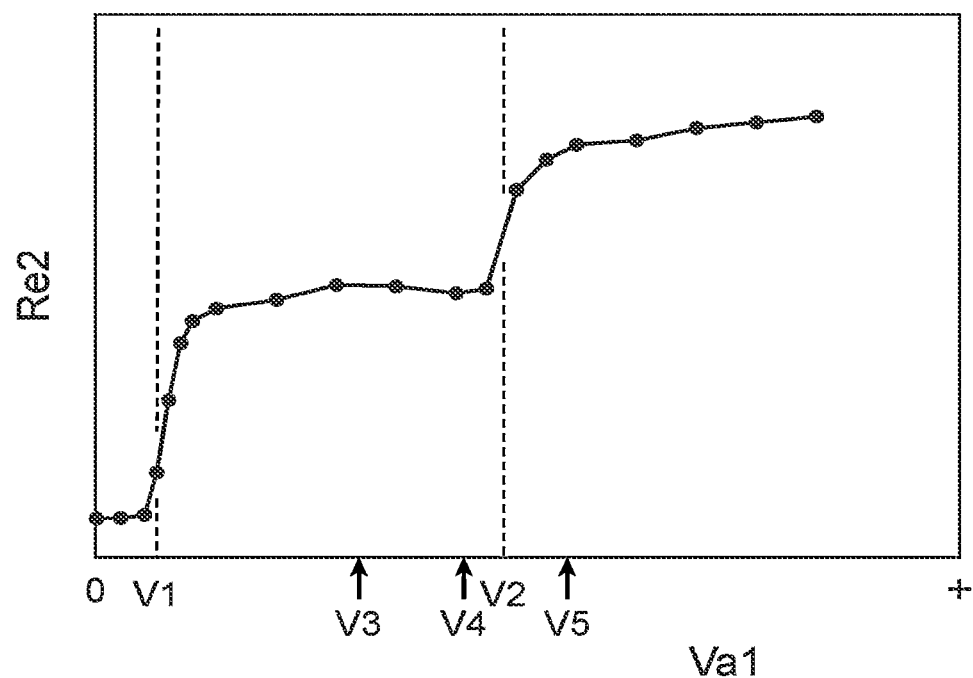
FIGS. 7A and 7B are schematic diagrams illustrating simulation results of a magnetic recording apparatus.
Figure 7B:
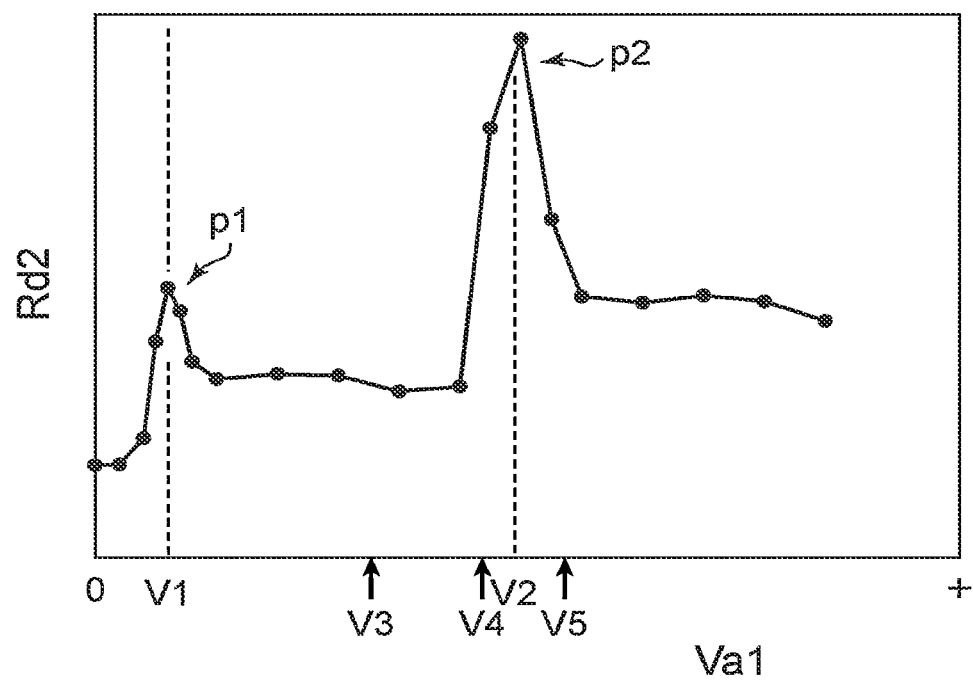

FIGS. 7A and 7B are schematic diagrams illustrating simulation results of a magnetic recording apparatus.

The horizontal axis of these figures is the applied voltage Va1. The vertical axis in FIG. 7A is the electrical resistance Re2 of the magnetic element 20. The vertical axis of FIG. 7B is the differential resistance Rd2 of the magnetic element 20. In the simulation, the influence of Joule heat is ignored in the electrical resistance Re2 and the differential resistance Rd2. Thermoelectric effects are ignored in the simulation.

As shown in FIG. 7A, at the first voltage V1 and at the second voltage V2, the electrical resistance Re2 changes discontinuously in a stepwise manner.

As shown in FIG. 7B, the differential resistance Rd2 becomes the first differential resistance peak p1 at the first voltage V1. At the second voltage V2, the differential resistance Rd2 becomes the second differential resistance peak p2.

Figure 8A:
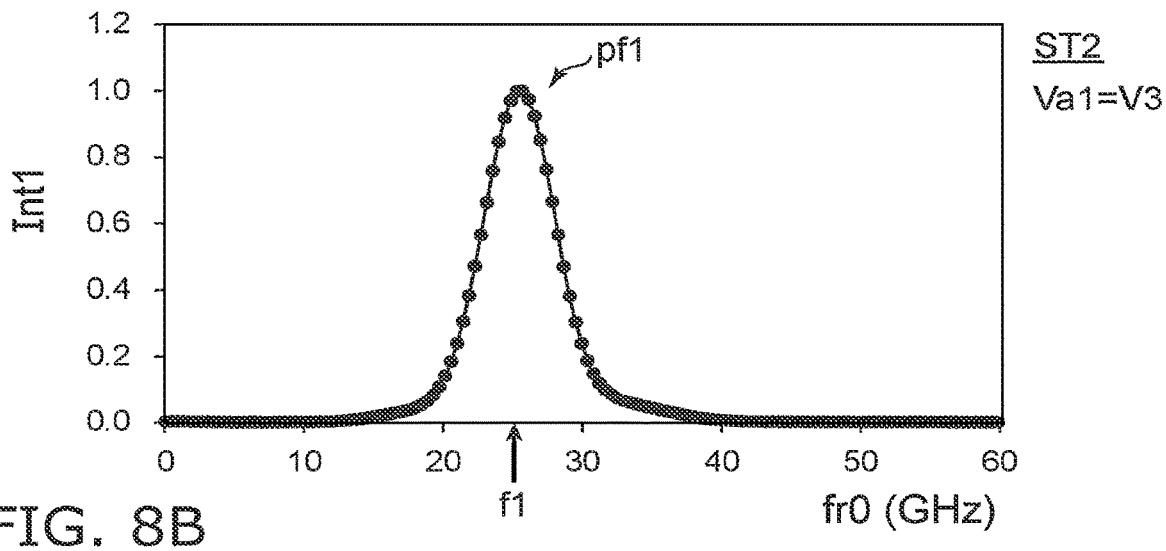
FIGS. 8A to 8C are schematic diagrams illustrating simulation results of a magnetic recording apparatus.
Figure 8B:
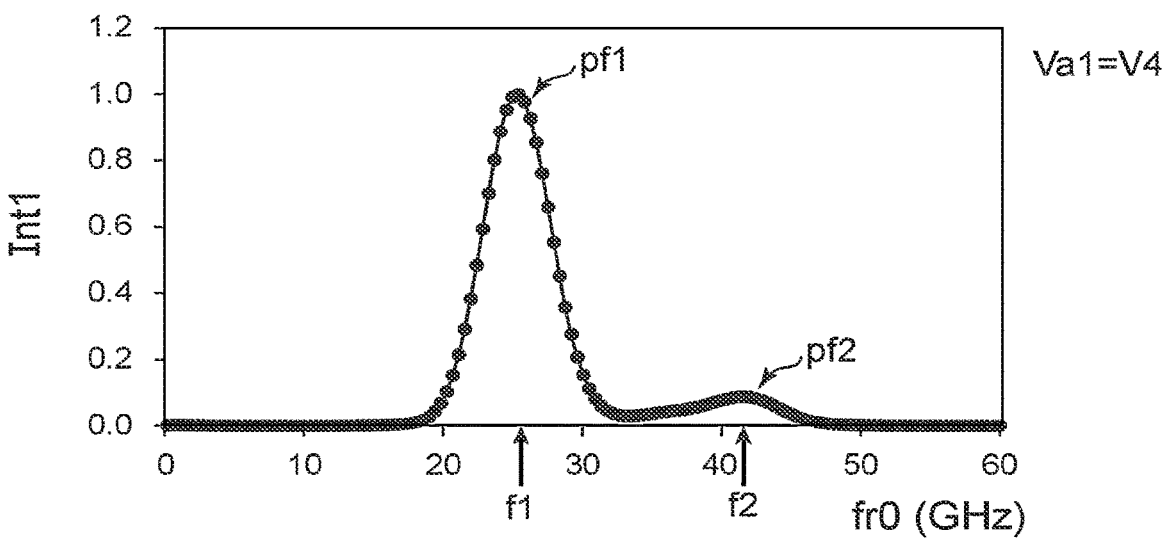
Figure 8C:
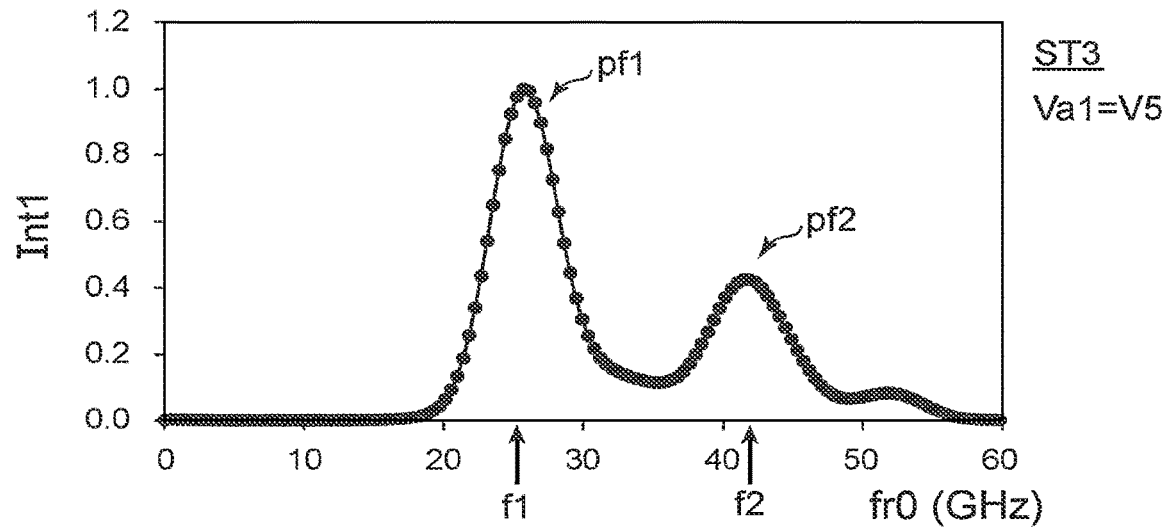

FIGS. 8A to 8C are schematic diagrams illustrating simulation results of a magnetic recording apparatus.

These figures illustrate a simulation result of the frequency components of the high-frequency signals generated from the magnetic element 20. The horizontal axis is the frequency fr0. The frequency fr0 corresponds to the frequency of the high-frequency signal obtained from the magnetic element 20. The frequency fr0 corresponds to the frequency of the alternating magnetic field obtained from the magnetic element 20. The vertical axis corresponds to the oscillation intensity Int1 (for example, amplitude) of the electrical resistance of the magnetic element 20. The vertical axis is normalized by the maximum values in FIGS. 8A to 8C. The vertical axis corresponds to the intensity of the high-frequency signal obtained from the magnetic element 20. The vertical axis corresponds to the intensity of the alternating magnetic field.

FIG. 8A corresponds to one state in the second state ST2. In FIG. 8A, the applied voltage Va1 is the third voltage V3 (see FIG. 7A and FIG. 7B). The third voltage V3 is higher than the first voltage V1 and less than the second voltage V2. In a state where the third voltage V3 is applied, one peak (first frequency peak pf1) is observed. In this example, the first frequency f1 corresponding to the first frequency peak pf1 is about 25 GHz.

In FIG. 8B, the applied voltage Va1 is a fourth voltage V4 (see FIG. 7A and FIG. 7B). The fourth voltage V4 is higher than the third voltage V3 and lower than the second voltage V2. As shown in FIG. 8B, when the fourth voltage V4 is applied, the first frequency peak pf1 and the second frequency peak pf2 are observed. In this example, the second frequency f2 corresponding to the second frequency peak pf2 is about 41 GHz.

FIG. 8C corresponds to one state in the third state ST3. As shown in FIG. 8C, the applied voltage Va1 is a fifth voltage V5 voltage (see FIG. 7A and FIG. 7B). The fifth voltage V5 is higher than the second voltage V2. As shown in FIG. 8C, the height of the second frequency peak pf2 is higher than the height of the second frequency peak pf2 in the example of FIG. 8B.

An alternating magnetic field of the first frequency f1 is used for the MAMR. An alternating magnetic field of the second frequency f2 is unnecessary in the MAMR. When the applied voltage Va1 becomes higher than the second voltage V2 (for example, the fifth voltage V5), the second frequency peak pf2 becomes excessively high.

Figure 9A:
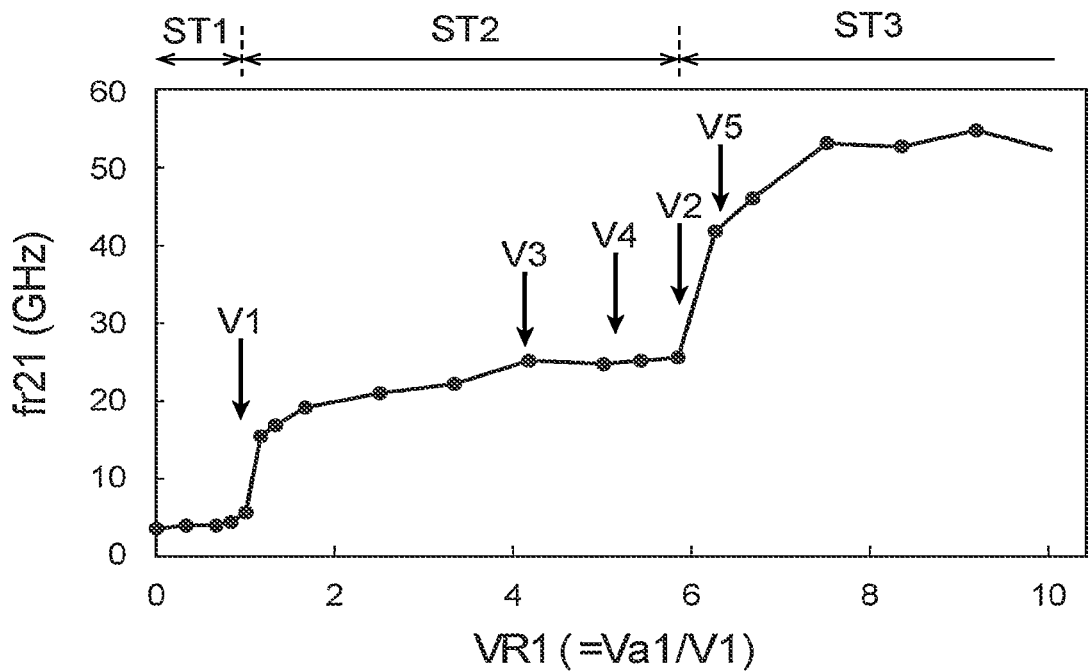
FIGS. 9A and 9B are schematic diagrams illustrating the simulation results of the magnetic recording apparatus.
Figure 9B:
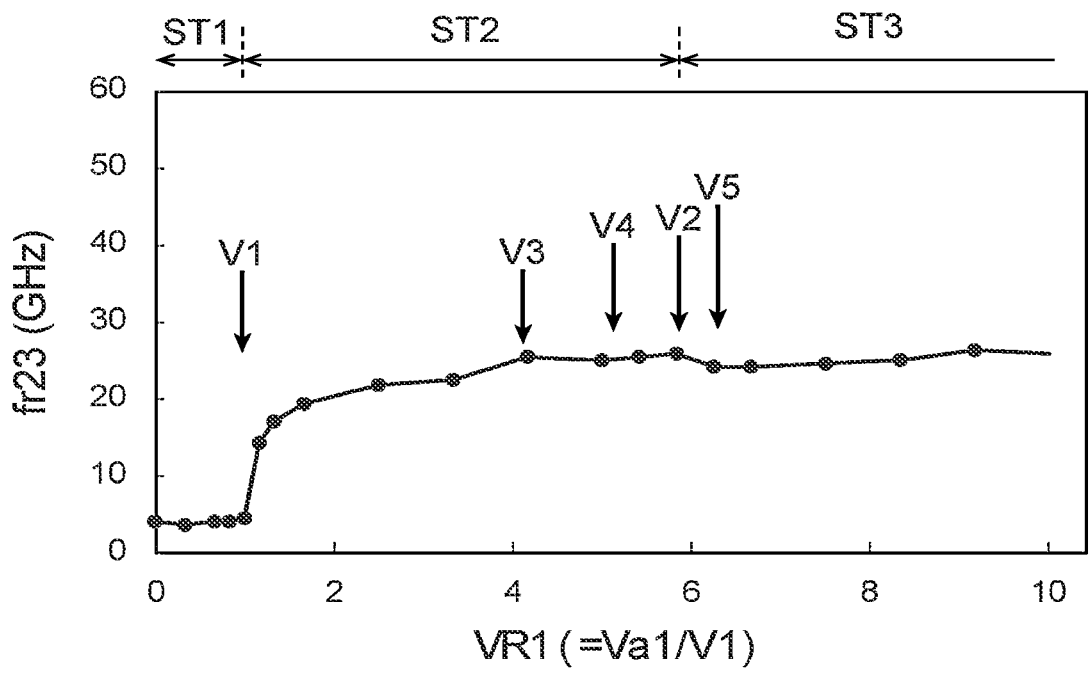

FIGS. 9A and 9B are schematic diagrams illustrating the simulation results of the magnetic recording apparatus.

The horizontal axis of FIGS. 9A and 9B is the normalized voltage VR1. The normalized voltage VR1 is a ratio (Va1/V1) of the applied voltage Va1 to the first voltage V1. The vertical axis of FIG. 9A is the oscillation frequency fr21 of the first magnetic layer 21. The oscillation frequency fr21 is a frequency corresponding to the oscillation of the maximum intensity in the oscillation of the first magnetic layer 21. The vertical axis of FIG. 9B is the oscillation frequency fr23 of the third magnetic layer 23. The oscillation frequency fr23 is a frequency corresponding to the oscillation of the maximum intensity in the oscillation of the third magnetic layer 23.

As shown in FIG. 9A, oscillation substantially does not occur when the normalized voltage VR1 is 1 or less. When the normalized voltage VR1 exceeds 1 (the applied voltage Va1 exceeds the first voltage V1), the oscillation frequency fr21 in the first magnetic layer 21 increases in a stepwise manner. When the applied voltage Va1 exceeds the second voltage V2, the oscillation frequency fr21 in the first magnetic layer 21 further rises in a stepwise manner.

As shown in FIG. 9B, oscillation substantially does not occur when the normalized voltage VR1 is 1 or less. When the normalized voltage VR1 exceeds 1 (when the applied voltage Va1 exceeds the first voltage V1, the oscillation frequency fr23 in the third magnetic layer 23 increases in a stepwise manner. Even if the applied voltage Va1 exceeds the second voltage V2, the oscillation frequency fr23 in the third magnetic layer 23 does not increase in a stepwise manner.

When the applied voltage Va1 is higher than the first voltage V1 and less than the second voltage V2, the oscillation frequency fr21 in the first magnetic layer 21 is substantially the same as the oscillation frequency fr23 in the third magnetic layer 23. In this state (second state ST2), it is considered that the magnetization 21M of the first magnetic layer 21 oscillates in the opposite phase in synchronization with the magnetization 23M of the third magnetic layer 23.

In such the second state ST2, by synchronous oscillation of the first magnetic layer 21 and the third magnetic layer 23 produces, for example, an alternating magnetic field of high intensity at a stable frequency can be obtained.

The oscillation frequency fr23 in the region exceeding the first voltage V1 illustrated in FIG. 9B corresponds to the first frequency f1 illustrated in FIG. 8A or the like. It is considered that the oscillation frequency fr21 in the region exceeding the second voltage V2 illustrated in FIG. 9A corresponds to the second frequency f2 illustrated in FIG. 8C or the like.

In the region exceeding the second voltage V2 (third state ST3), it is considered that the plurality of oscillation layers included in the magnetic element 20 oscillate at different frequencies. Such a state specifically occurs when a plurality of oscillation layers are provided. In the second state ST2, a plurality of oscillation layers oscillate synchronously, and one oscillation frequency of high intensity is obtained.

In the fourth voltage V4 and the fifth voltage V5 illustrated in FIGS. 9A and 9B, it is considered that the second frequency peak pf2 of the second frequency f2 illustrated in FIGS. 8A and 8C is generated.

Figure 10A:
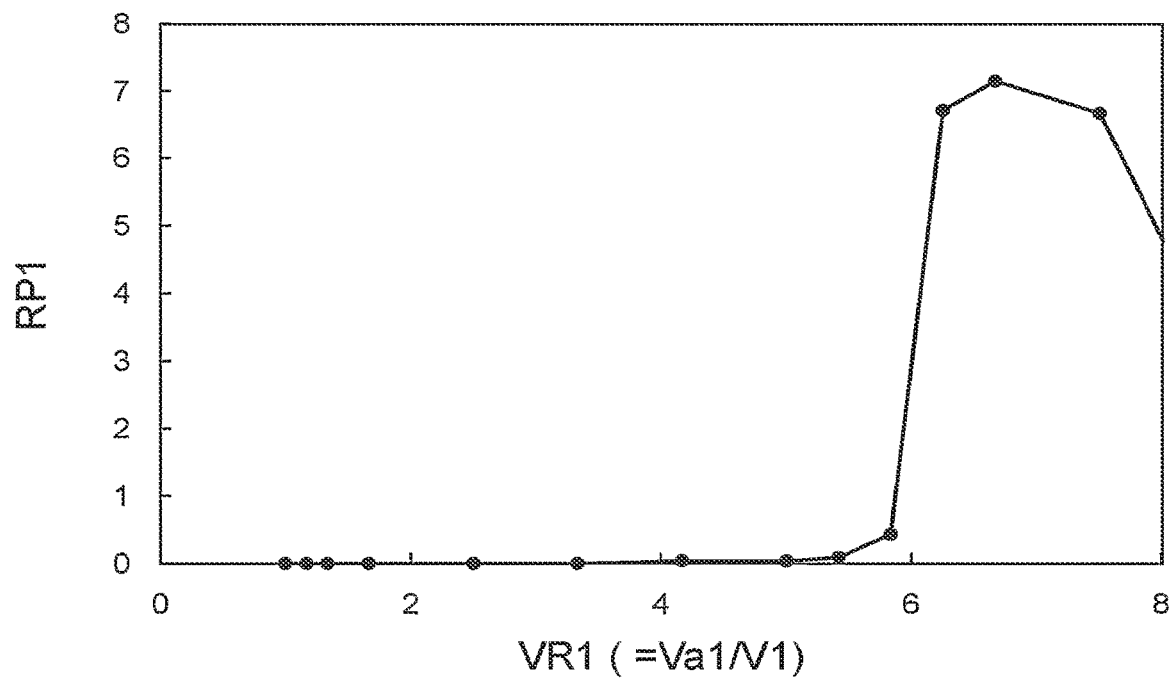
FIGS. 10A and 10B are schematic diagrams illustrating simulation results of a magnetic recording apparatus.
Figure 10B:
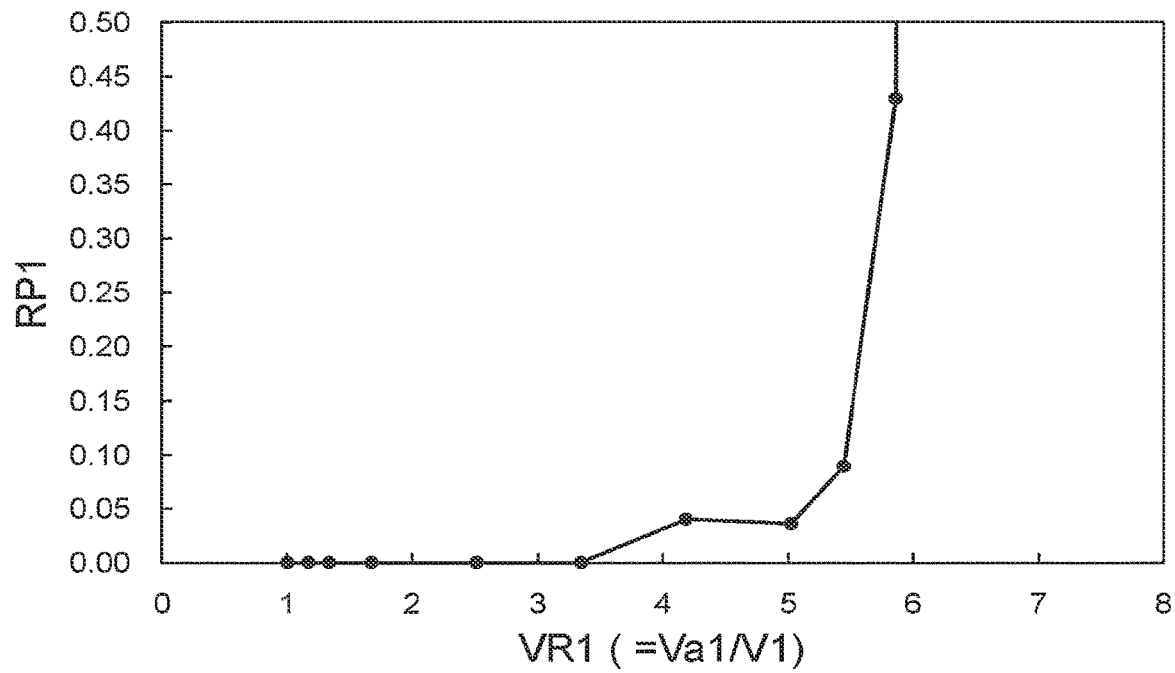

FIGS. 10A and 10B are schematic diagrams illustrating simulation results of a magnetic recording apparatus.

The horizontal axis of these figures is the normalized voltage VR1. The vertical axis of these figures is the peak ratio RP1. The peak ratio RP1 is a ratio of the height (intensity) of the second frequency peak to the height (intensity) of the first frequency peak. The vertical axis of FIG. 9B is enlarged.

As shown in FIGS. 10A and 10B, when the normalized voltage VR1 exceeds 5.4, the peak ratio RP1 rapidly increases. The region where the peak ratio RP1 rapidly increases corresponds to the third state ST3.

In the embodiment, it is practically preferable that the peak ratio RP1 is 0.1 or less. Thereby, the influence of the second frequency peak pf2 not used in the MAMR is suppressed. Thereby, MAMR by the first frequency peak pf1 can be effectively performed. Excessively high voltage (excessively large current) is suppressed, and more stable magnetic head characteristics are obtained. For example, a practical magnetic recording apparatus having a long life can be obtained. For example, an excessively large write area is suppressed. High recording density is obtained.

In the embodiments, the normalized voltage VR1 is preferably less than 5.4. Thereby, the second frequency peak pf2 which is not utilized in the MAMR is suppressed. In the embodiments, the normalized voltage VR1 is more preferably 5 or less. The second frequency peak pf2 is stably suppressed. In this example, the normalized voltage VR1 is 5.4 at the second voltage V2.

Thus, when the applied voltage Va1 applied between the first terminal T1 and the second terminal T2 while the recording current Iw is supplied to the coil 30c is higher than the second voltage V2, the frequency component of the signal obtained from the magnetic element 20 includes a first frequency peak pf1 of the first frequency f1 and a second frequency peak pf2 of the second frequency f2. The second frequency f2 is higher than the first frequency f1.

In the embodiment, when the applied voltage Va1 applied between the first terminal T1 and the second terminal T2 while the recording current Iw is supplied to the coil 30c is the element voltage V20, the frequency component of the signal obtained from the magnetic element 20 includes the first frequency peak pf1 and does not include the second frequency peak pf2. Alternatively, the ratio of the height of the second frequency peak pf2 to the height of the first frequency peak pf1 is 0.1 or less.

In the embodiment, the element voltage V20 is preferably higher than the first voltage V1 and less than 5.4 times the first voltage V1. In the embodiment, the element voltage V20 is more preferably 5 times or less of the first voltage V1.

By applying the above-described element voltage V20 to the magnetic element 20, a strong alternating magnetic field with a stable frequency can be obtained.

In the embodiment, the second voltage V2 in which the electrical resistance Re1 changes in a stepwise manner may not be clearly observed. In the embodiment, the second voltage V2 (the voltage at which the second differential resistance peak p2 occurs) may not be clearly observed in the differential resistance Rd1. In this case, the element voltage V20 in the recording operation may be set to less than 5.4 times the first voltage V1.

As shown in FIG. 5, the first non-magnetic layer 41 has a thickness t41. The second non-magnetic layer 42 has a thickness t42. The third non-magnetic layer 43 has a thickness t43. The fourth non-magnetic layer 44 has a thickness t44. The fifth non-magnetic layer 45 has a thickness t45. These thicknesses are lengths along the first direction D1. At least one of these thicknesses is, for example, not less than 5 nm and not more than 15 nm.

Hereinafter, some examples of the magnetic head in the magnetic recording device 210 according to the embodiment will be described.

Figure 11:
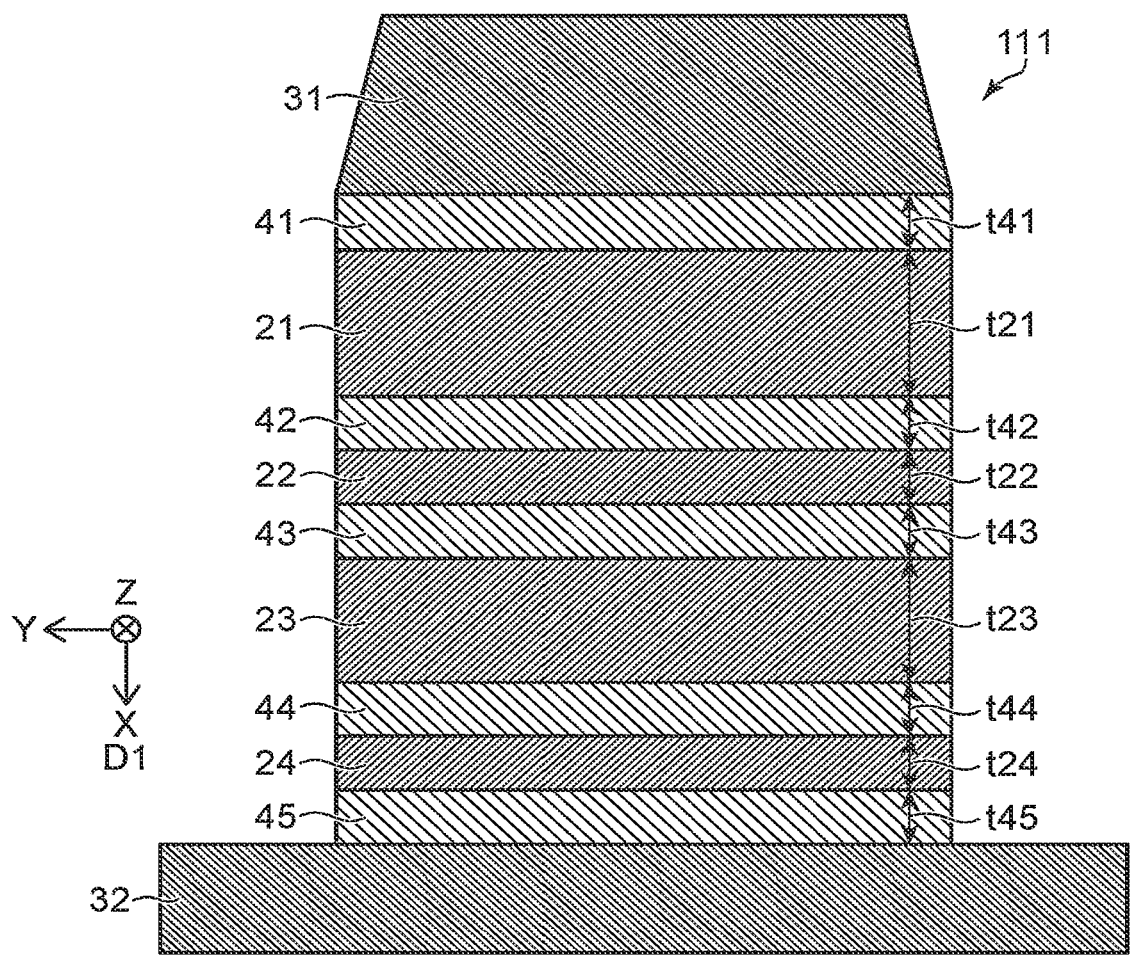
FIG. 11 is a schematic plan view illustrating a part of the magnetic recording apparatus according to the first embodiment.

FIG. 11 is a schematic plan view illustrating a part of the magnetic recording apparatus according to the first embodiment.

As shown in FIG. 11, in a magnetic head 111 according to the embodiment, the magnetic element 20 includes the first magnetic layer 21, the second magnetic layer 22, the third magnetic layer 23, and the fourth magnetic layer 24. In the magnetic head 111, the first thickness t21 is thicker than the second thickness t22. The first thickness t21 is thicker than the fourth thickness t24. The third thickness t23 is thicker than the second thickness t22. The third thickness t23 is thicker than the fourth thickness t24. The first magnetic layer 21 and the third magnetic layer 23 are, for example, oscillation layers. The second magnetic layer 22 and the fourth magnetic layer 24 are, for example, spin injection layers.

In the magnetic head 111, the magnetic element 20 also includes the first non-magnetic layer 41, the second non-magnetic layer 42, the third non-magnetic layer 43, the fourth non-magnetic layer 44, and the fifth non-magnetic layer 45. In the magnetic head 111, the material of these non-magnetic layers is different from the material in the magnetic head 110.

In the magnetic head 111, the first non-magnetic layer 41 includes at least one selected from the group consisting of Cu, Au, Cr, V, Al and Ag. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt, and W. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt, and W.

In the magnetic head 111, the element voltage V20 in the recording operation is higher than the first voltage V1 and lower than the second voltage V2. For example, the differential resistance Rd1 of the magnetic element 20 becomes the first differential resistance peak p1 when the applied voltage Va1 is the first voltage V1. The differential resistance Rd1 becomes the second differential resistor peak p2 when the applied voltage Va1 is the second voltage V2. The second voltage V2 is higher than twice the first voltage V1.

In the magnetic head 111, the element voltage V20 in the recording operation may be set to less than 5.4 times the first voltage V1.

Also in the magnetic head 111, when the applied voltage Va1 applied between the first terminal T1 and the second terminal T2 while the recording current Iw is supplied to the coil 30c is the element voltage V20, the frequency component of the signal obtained from the magnetic element 20 includes the first frequency peak pf1 and does not include the second frequency peak pf2. Alternatively, the ratio of the height of the second frequency peak pf2 to the height of the first frequency peak pf1 is 0.1 or less.

Figure 12:
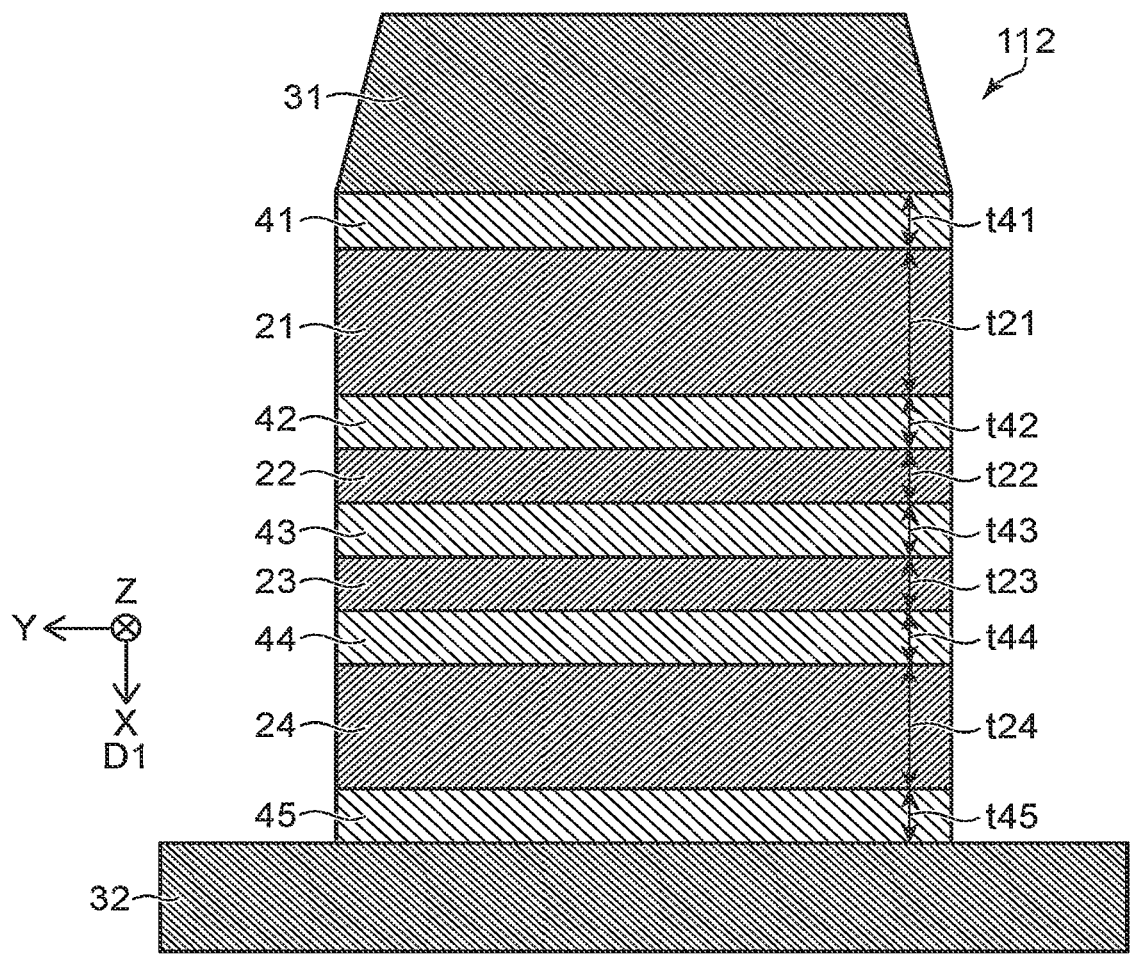
FIG. 12 is a schematic plan view illustrating a part of the magnetic recording apparatus according to the first embodiment.

FIG. 12 is a schematic plan view illustrating a part of the magnetic recording apparatus according to the first embodiment.

As shown in FIG. 12, in a magnetic head 112 according to the embodiment, the magnetic element 20 includes the first magnetic layer 21, the second magnetic layer 22, the third magnetic layer 23, and the fourth magnetic layer 24. In the magnetic head 112, the first thickness t21 is thicker than the second thickness t22. The first thickness t21 is thicker than the third thickness t23. The fourth thickness t24 is thicker than the second thickness t22. The fourth thickness t24 is thicker than the third thickness t23. In the magnetic head 112, the first magnetic layer 21 and the fourth magnetic layer 24 are, for example, oscillation layers. The second magnetic layer 22 and the third magnetic layer 23 are, for example, spin injection layers.

In the magnetic head 112, the magnetic element 20 includes the first non-magnetic layer 41, the second non-magnetic layer 42, the third non-magnetic layer 43, the fourth non-magnetic layer 44, and the fifth non-magnetic layer 45. In the magnetic head 112, the first non-magnetic layer 41 includes at least one selected from the group consisting of Cu, Au, Cr, V, Al and Ag. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt, and W. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt, and W.

In the magnetic head 112, the element voltage V20 in the recording operation is higher than the first voltage V1 and lower than the second voltage V2. For example, the differential resistance Rd1 of the magnetic element 20 becomes the first differential resistance peak p1 when the applied voltage Va1 is the first voltage V1. The differential resistance Rd1 becomes the second differential resistance peak p2 when the applied voltage Va1 is the second voltage V2. The second voltage V2 is higher than the first voltage V1.

In the magnetic head 112, the element voltage V20 in the recording operation may be set to less than 5.4 times the first voltage V1.

Also in the magnetic head 112, when the applied voltage Va1 applied between the first terminal T1 and the second terminal T2 while the recording current Iw is supplied to the coil 30c is the element voltage V20, the frequency component of the signal obtained from the magnetic element 20 includes the first frequency peak pf1 and does not include the second frequency peak pf2. Alternatively, the ratio of the height of the second frequency peak pf2 to the height of the first frequency peak pf1 is 0.1 or less.

Figure 13:
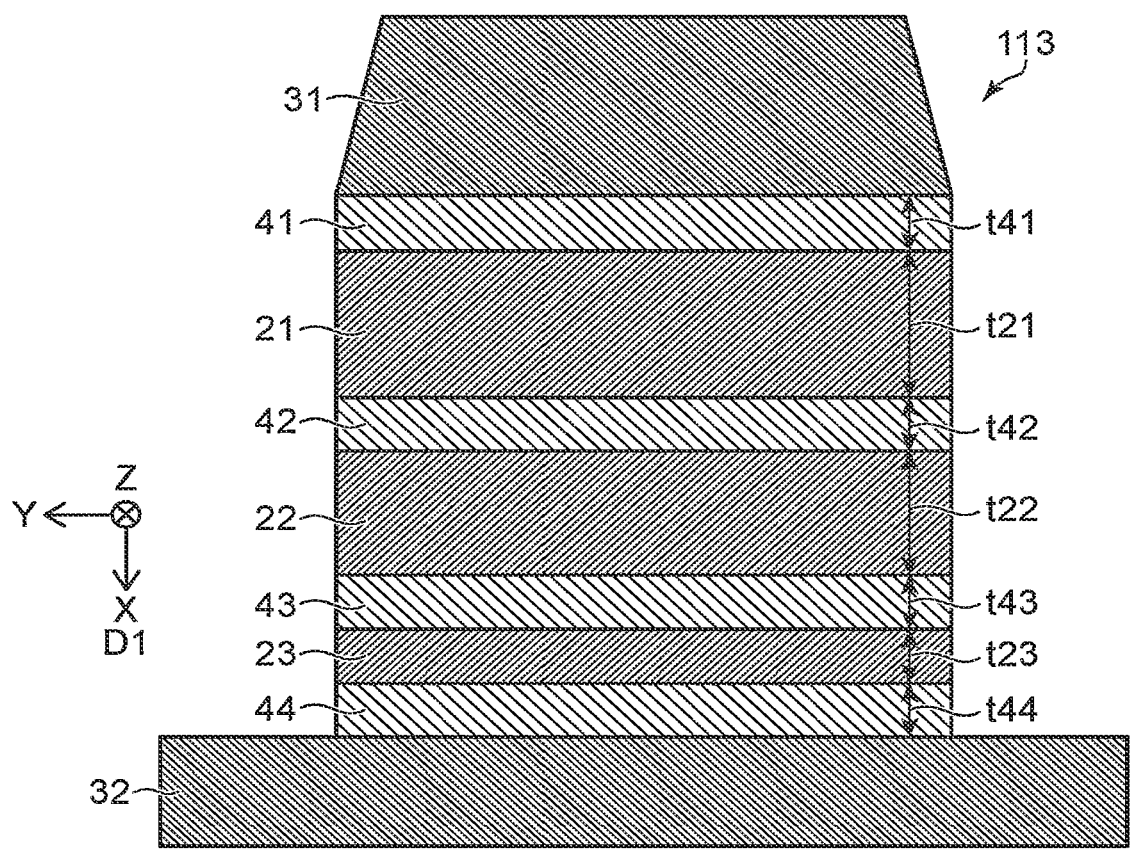
FIG. 13 is a schematic plan view illustrating a part of the magnetic recording apparatus according to the first embodiment.

FIG. 13 is a schematic plan view illustrating a part of the magnetic recording apparatus according to the first embodiment.

As shown in FIG. 13, in a magnetic head 113 according to the embodiment, the magnetic element 20 includes the first magnetic layer 21, the second magnetic layer 22, and the third magnetic layer 23. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The direction from the first magnetic pole 31 to the second magnetic pole 32 is defined as the first direction D1. The first thickness t21 of the first magnetic layer 21 along the first direction D1 is thicker than the third thickness t23 of the third magnetic layer 23 along the first direction D1. The second thickness t22 of the second magnetic layer 22 along the first direction D1 is thicker than the third thickness t23. In the magnetic head 113, the first magnetic layer 21 and the second magnetic layer 22 are, for example, oscillation layers. The third magnetic layer 23 is, for example, a spin injection layer.

In the magnetic head 113, the magnetic element 20 includes the first non-magnetic layer 41, the second non-magnetic layer 42, the third non-magnetic layer 43, and the fourth non-magnetic layer 44. The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the second magnetic pole 32.

In the magnetic head 113, the first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt, and W. The third non-magnetic layer 43 includes at least one selected from the group consisting of Cu, Au, Cr, V, Al and Ag. The fourth non-magnetic layer 44 includes at least one selected from the group consisting of Ru, Ir, Ta, Rh, Pd, Pt, and W.

In the magnetic head 113, the element voltage V20 in the recording operation is higher than the first voltage V1 and lower than the second voltage V2. For example, the differential resistance Rd1 of the magnetic element 20 becomes the first differential resistance peak p1 when the applied voltage Va1 is the first voltage V1. The differential resistor Rd1 becomes the second differential resistor peak p2 when the applied voltage Va1 is the second voltage V2. The second voltage V2 is higher than the first voltage V1.

In the magnetic head 113, the element voltage V20 in the recording operation may be set to less than 5.4 times the first voltage V1.

In the magnetic head 113, when the applied voltage Va1 applied between the first terminal T1 and the second terminal T2 while the recording current Iw is supplied to the coil 30c is the element voltage V20, the frequency component of the signal obtained from the magnetic element 20 includes the first frequency peak pf1 and does not include the second frequency peak pf2. Alternatively, the ratio of the height of the second frequency peak pf2 to the height of the first frequency peak pf1 is 0.1 or less.

When evaluating the characteristics of the magnetic element 20, an alternating electromagnetic force for the first evaluation may be applied to the magnetic element 20. The frequency of the first evaluation alternating electromagnetic force is higher than the frequency of the alternating magnetic field generated from the magnetic element 20 in the recording operation. The frequency of the first evaluation alternating electromagnetic force is higher than the frequency of the alternating magnetic field generated from the magnetic element 20 in the second state ST2. When such the first evaluation alternating electromagnetic force is applied in the second state ST2, for example, the electrical resistance Re1 changes (increases or decreases). For example, there exists a frequency of the first evaluation alternating electromagnetic force at which the change of the electrical resistance Re1 becomes maximum. The change of the electrical resistance Re1 with respect to the frequency of the first evaluation alternating electromagnetic force has, for example, an extremum.

When evaluating the characteristics of the magnetic element 20, an alternating electromagnetic force for second evaluation may be applied to the magnetic element 20. The frequency of the second evaluation alternating electromagnetic force is higher than the frequency of the alternating magnetic field generated from the magnetic element 20 in the third state ST3. When such the second evaluation alternating electromagnetic force is applied in the third state ST3, for example, the electrical resistance Re1 changes (increases or decreases). For example, there exists a frequency of the second evaluation alternating electromagnetic force at which the change of the electrical resistance Re1 becomes maximum. The change of the electrical resistance Re1 with respect to the frequency of the second evaluation alternating electromagnetic force has, for example, an extremum. On the other hand, even if the first evaluation alternating electromagnetic force or the second evaluation alternating electromagnetic force is applied in the first state ST1, the electrical resistance Re1 does not substantially change. For example, the electrical resistance Re1 does not change with respect to the frequency of the alternating electromagnetic force.

When evaluating the characteristics of the magnetic element 20, alternating electromagnetic force for third evaluation may be applied to the magnetic element 20. The frequency of the third evaluation alternating electromagnetic force is lower than the frequency of the alternating magnetic field generated from the magnetic element 20 in the recording operation. The frequency of the third evaluation alternating electromagnetic force is lower than the frequency of the alternating magnetic field generated from the magnetic element 20 in the second state ST2. When such the third evaluation alternating electromagnetic force is applied in the second state ST2, for example, the electrical resistance Re1 changes (increases or decreases). The orientation of the change in the electrical resistance Re1 when the third evaluation alternating electromagnetic force is applied and the orientation of the change in the electrical resistance Re1 when the first evaluation alternating electromagnetic force is applied are opposite, for example. For example, there exists a frequency of the third evaluation alternating electromagnetic force at which the change of the electric resistance Re1 becomes maximum. The change of the electric resistance Re1 with respect to the frequency of the third evaluation alternating electromagnetic force has, for example, an extremum.

When evaluating the characteristics of the magnetic element 20, an alternating electromagnetic force for fourth evaluation may be applied to the magnetic element 20. The frequency of the fourth evaluation alternating electromagnetic force is lower than the frequency of the alternating magnetic field generated from the magnetic element 20 in the third state ST3. When such the fourth evaluation alternating electromagnetic force is applied in the third state ST3, for example, the electrical resistance Re1 changes (increases or decreases). The orientation of the change in the electrical resistance Re1 when the fourth evaluation alternating electromagnetic force is applied and the orientation of the change in the electrical resistance Re1 when the second evaluation alternating electromagnetic force is applied are opposite, for example. For example, there exists a frequency of the fourth evaluation alternating electromagnetic force at which the change of the electric resistance Ret becomes maximum. The change of the electrical resistance Re1 with respect to the frequency of the fourth evaluation alternating electromagnetic force has, for example, an extremum. On the other hand, even if the third evaluation alternating electromagnetic force or the fourth evaluation alternating electromagnetic force is applied in the first state ST1, the electrical resistance Re1 does not substantially change. For example, the electrical resistance Re1 does not change with respect to the frequency of the alternating electromagnetic force.

When evaluating the characteristics of the magnetic element 20, an alternating electromagnetic force for fifth evaluation may be applied to the magnetic element 20. The frequency of the fifth evaluation alternating electromagnetic force is substantially the same as the frequency of the alternating magnetic field generated from the magnetic element 20 in the recording operation. The frequency of the fifth evaluation alternating electromagnetic force is substantially the same as the frequency of the alternating magnetic field generated from the magnetic element 20 in the second state ST2. When the fifth evaluation alternating electromagnetic force is applied in the first state ST1 and the second state ST2, for example, the electric resistance Re1 does not change.

When evaluating the characteristics of the magnetic element 20, an alternating electromagnetic force for sixth evaluation may be applied to the magnetic element 20. The frequency of the sixth evaluation alternating electromagnetic force is substantially the same as the frequency of the alternating magnetic field generated from the magnetic element 20 in the third state ST3. When such the sixth evaluation alternating electromagnetic force is applied in the first state ST1 and the third state ST3, for example, the electric resistance Re1 does not change.

From the characteristics of the change in the electric resistance Re1 with respect to the first to sixth evaluation alternating electromagnetic force as described above, information on the alternating magnetic field generated from the magnetic element 20 in the recording operation can be obtained. It may be considered that a high-frequency signal (or alternating magnetic field) is generated from the magnetic element 20 at the frequency of the alternating magnetic field at which the above-described characteristics are obtained.

Second Embodiment

In the following embodiments, the magnetic head (such as the magnetic head 110) described with respect to the first embodiment and its modification are applied. Cases where the magnetic head 110 is used will be described below.

Figure 14:
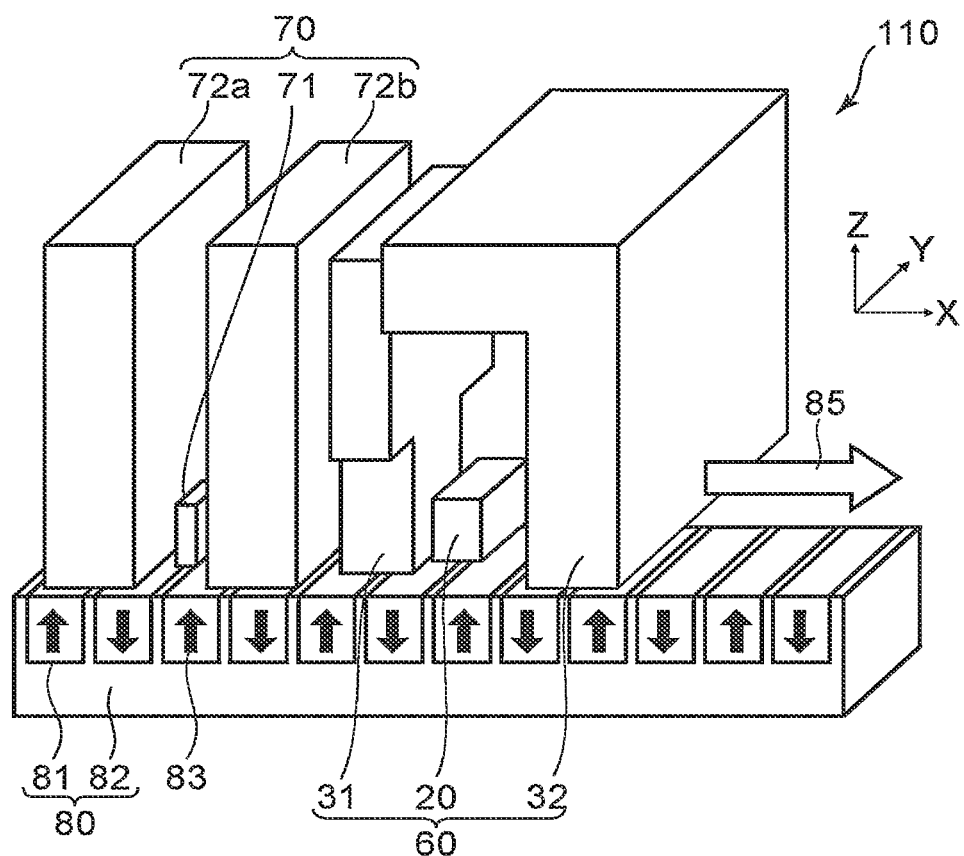
FIG. 14 is a schematic perspective view illustrating the magnetic recording device according to a second embodiment.

FIG. 14 is a schematic perspective view illustrating the magnetic recording device according to a second embodiment.

As shown in FIG. 14, the magnetic head according to the embodiment (for example, the magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is possible to output a signal corresponding to the magnetization 83 of the magnetic recording layer 81.

As shown in FIG. 14, the magnetic recording medium 80 moves relative to the magnetic head 110 in a direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 15:
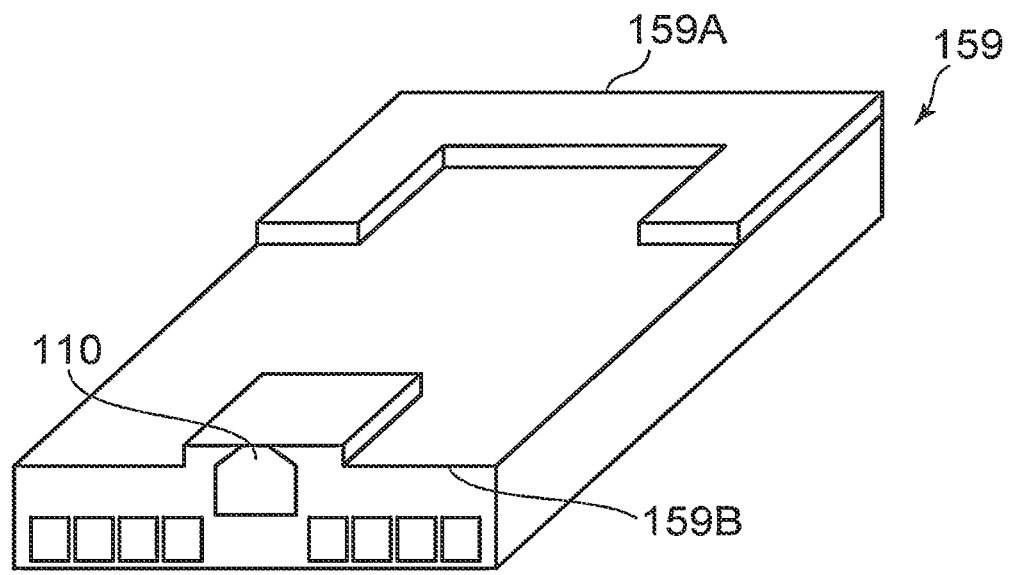
FIG. 15 is a schematic perspective view illustrating a portion of the magnetic recording device according to the embodiment.

FIG. 15 is a schematic perspective view illustrating a portion of the magnetic recording device according to the embodiment.

FIG. 15 illustrates a head slider.

The magnetic head 110 is provided on a head slider 159. The head slider 159 includes, for example, $Al_2O_3$/TiC and the like. The head slider 159 moves relative to the magnetic recording medium while floating or contacting the magnetic recording medium.

The head slider 159 includes, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 16:
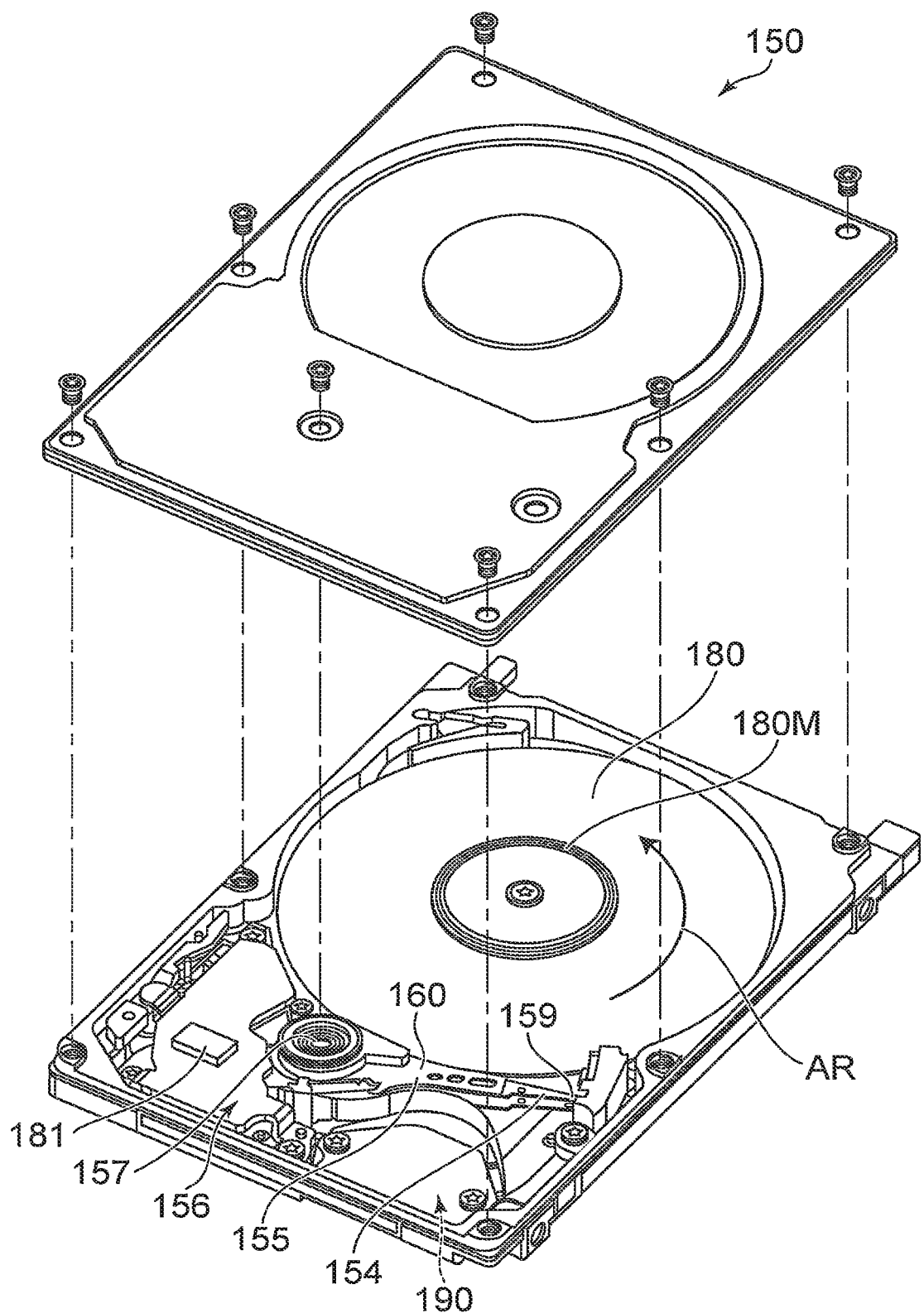
FIG. 16 is a schematic perspective view illustrating a magnetic recording device according to the embodiment.

FIG. 16 is a schematic perspective view illustrating a magnetic recording device according to the embodiment.

As shown in FIG. 16, in the magnetic recording device 150 according to the embodiment, a rotary actuator is used. A recording medium disk 180 is mounted on a spindle motor 180M. The recording medium disk 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disk 180 is a predetermined fly height. In the embodiment, the head slider 159 may contact the recording medium disk 180. For example, a contact-sliding type may be applied.

The suspension 154 is connected to one end of an arm 155 (e.g., an actuator arm). The arm 155 includes, for example, a bobbin portion and the like. The bobbin portion holds a drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 17A:
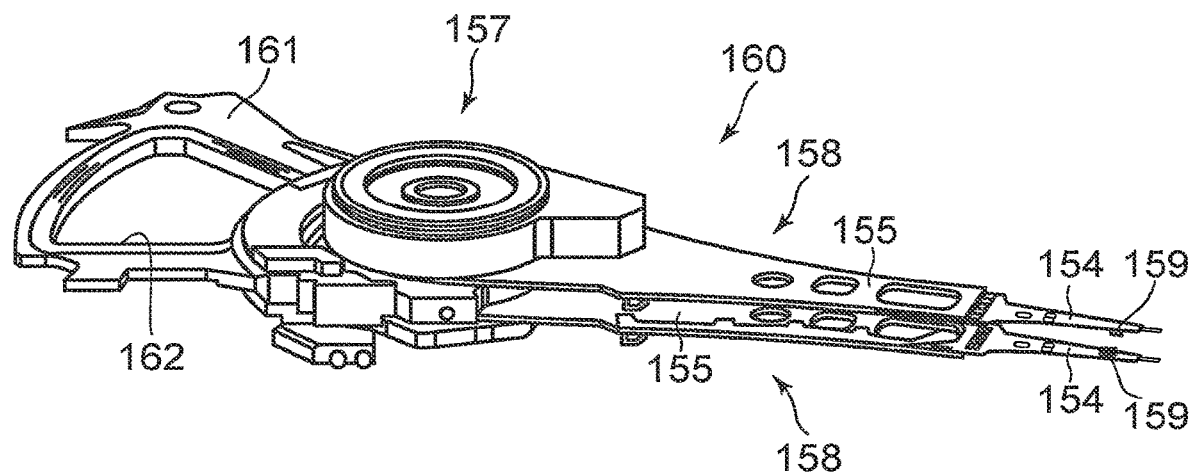
FIGS. 17A and 17B are schematic perspective views illustrating a portion of the magnetic recording device according to the embodiment.
Figure 17B:
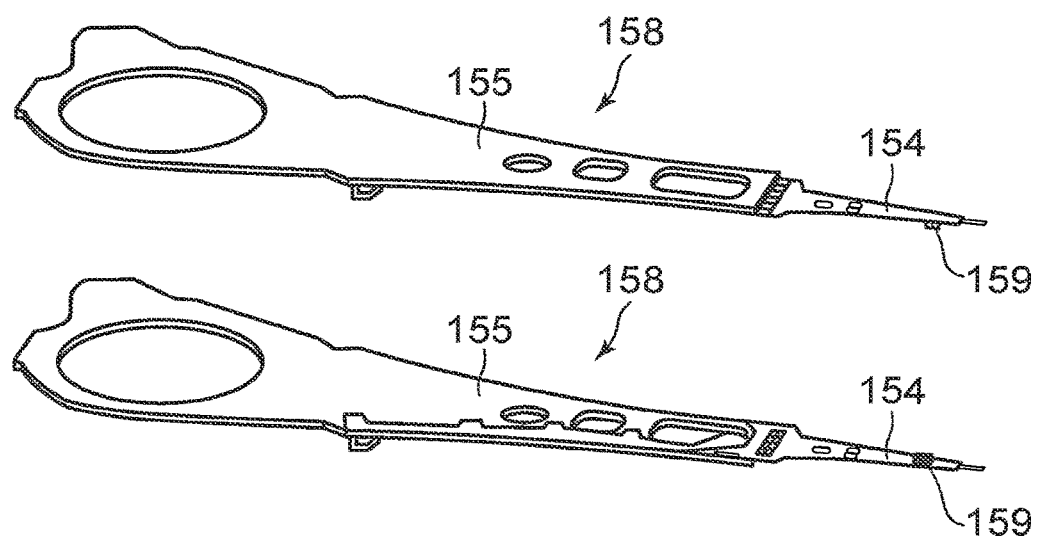

FIGS. 17A and 17B are schematic perspective views illustrating a portion of the magnetic recording device according to the embodiment.

FIG. 17A illustrates a partial configuration of the magnetic recording device and is an enlarged perspective view of a head stack assembly 160. FIG. 17B is a perspective view illustrating a magnetic head assembly (head gimbal assembly: HGA) 158 that is a portion of the head stack assembly 160.

As shown in FIG. 17A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 17B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. The input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158.

The embodiment may include the following configurations (e.g., technical proposals).

Configuration 1

A magnetic recording device, comprising:
 a magnetic head including
  a first magnetic pole,
  a second magnetic pole,
  a magnetic element provided between the first magnetic pole and the second magnetic pole,
  a first terminal electrically connected to one end of the magnetic element,
  a second terminal electrically connected to another end of the magnetic element,
  a coil; and
 a controller electrically connected to the magnetic element and the coil,
 the controller being configured to perform a recording operation,
 in the recording operation, the controller being configured to supply a recording current to the coil while applying an element voltage between the first terminal and the second terminal,
 an alternating magnetic field being generated from the magnetic element in the recording operation,
 wherein
 when an applied voltage applied between the first terminal and the second terminal is changed while the recording current is supplied to the coil, a differential resistance of the magnetic element becomes a first differential resistance peak when the applied voltage is a first voltage, the differential resistance becomes a second differential resistance peak when the applied voltage is a second voltage, the second voltage being higher than the first voltage, and
 the element voltage being higher than the first voltage and lower than the second voltage.

Configuration 2

The device according to Configuration 1, wherein
 when the applied voltage is higher than a first voltage and lower than a second voltage, the alternating magnetic field is generated from the magnetic element, and
 the alternating magnetic field is not generated from the magnetic element when the applied voltage is lower than the first voltage.

Configuration 3
The device according to Configuration 1 or 2, wherein a frequency of the alternating magnetic field is not less than 10 GHz and not more than 40 GHz.

Configuration 4
The device according to any one of Configurations 1 to 3, wherein in the recording operation, a potential of the first magnetic pole is higher than a potential of the second magnetic pole.

Configuration 5
The device according to any one of Configurations 1 to 4, wherein
in the recording operation, an element current in an orientation from the first magnetic pole to the second magnetic pole flows to the magnetic element, and
when a current from the second magnetic pole to the first magnetic pole flows to the magnetic element while the recording current is supplied to the coil, the alternating magnetic field is not generated from the magnetic element.

Configuration 6
The device according to any one of Configurations 1 to 5, wherein
when the applied voltage applied between the first terminal and the second terminal while the recording current is supplied to the coil is higher than the second voltage, a frequency component of a signal obtained from the magnetic element includes a first frequency peak of a first frequency and a second frequency peak of a second frequency higher than the first frequency, and
when the applied voltage applied between the first terminal and the second terminal while the recording current is supplied to the coil is the element voltage, the frequency component includes the first frequency peak and does not include the second frequency peak, or a ratio of a height of the second frequency peak to a height of the first frequency peak is 0.1 or less Configuration 7
A magnetic recording device, comprising:
a magnetic head including
a first magnetic pole,
a second magnetic pole,
a magnetic element provided between the first magnetic pole and the second magnetic pole,
a first terminal electrically connected to one end of the magnetic element,
a second terminal electrically connected to another end of the magnetic element,
a coil; and
a controller electrically connected to the magnetic element and the coil,
the controller being configured to perform a recording operation,
in the recording operation, the controller being configured to supply a recording current to the coil while applying an element voltage between the first terminal and the second terminal,
an alternating magnetic field being generated from the magnetic element in the recording operation,
wherein
when an applied voltage applied between the first terminal and the second terminal while the recording current is supplied to the coil is higher than a first applied voltage, a frequency component of a signal obtained from the magnetic element includes a first frequency peak of a first frequency and a second frequency peak of a second frequency higher than the first frequency, and
when the applied voltage applied between the first terminal and the second terminal while the recording current is supplied to the coil is the element voltage, the frequency component includes the first frequency peak and does not include the second frequency peak, or a ratio of a height of the second frequency peak to a height of the first frequency peak is 0.1 or less.

Configuration 8
A magnetic recording device, comprising:
a magnetic head including
a first magnetic pole,
a second magnetic pole,
a magnetic element provided between the first magnetic pole and the second magnetic pole,
a first terminal electrically connected to one end of the magnetic element,
a second terminal electrically connected to another end of the magnetic element,
a coil; and
a controller electrically connected to the magnetic element and the coil,
the controller being configured to perform a recording operation,
in the recording operation, the controller being configured to supply a recording current to the coil while applying an element voltage between the first terminal and the second terminal,
an alternating magnetic field being generated from the magnetic element in the recording operation,
wherein
a differential resistance of the magnetic element when an applied voltage applied between the first terminal and the second terminal is changed while the recording current is supplied to the coil becomes a first differential resistance peak when the applied voltage is a first voltage, and
the element voltage is higher than the first voltage and less than 5.4 times the first voltage.

Configuration 9
The device according to Configuration 8, wherein the element voltage is 5 times or less of the first voltage.

Configuration 10
The device according to Configuration 8 or 9, wherein
when the applied voltage is higher than the first voltage, the alternating magnetic field is generated from the magnetic element, and
the alternating magnetic field is not generated from the magnetic element when the applied voltage is lower than the first voltage.

Configuration 11
The device according to any one of Configurations 8 to 10, wherein a frequency of the alternating magnetic field is not less than 10 GHz and not more than 40 GHz.

Configuration 12
The device according to any one of Configurations 8 to 11, wherein in the recording operation, a potential of the first magnetic pole is higher than a potential of the second magnetic pole.

Configuration 13
The device according to any one of Configurations 8 to 12, wherein
in the recording operation, an element current in an orientation from the first magnetic pole to the second magnetic pole flows to the magnetic element, and
when a current from the second magnetic pole to the first magnetic pole flows to the magnetic element while the recording current is supplied to the coil, the alternating magnetic field is not generated from the magnetic element.

Configuration 14

The device according to any one of Configurations 1 to 13, wherein
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole,
a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and
a third thickness of the third magnetic layer along the first direction is thicker than the second thickness and thicker than the fourth thickness.

Configuration 15

The device according to Configuration 14, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt, and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

Configuration 16

The device according to Configuration 14, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt, and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

Configuration 17

The device according to any one of Configurations 1 to 13, wherein
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole,
a first thickness of the first magnetic layer along a first direction from the first magnetic pole to the second magnetic pole is thicker than a second thickness of the second magnetic layer along the first direction and thicker than a third thickness of the third magnetic layer along the first direction, and
a fourth thickness of the fourth magnetic layer along the first direction is thicker than the second thickness and thicker than the third thickness.

Configuration 18

The device according to Configuration 17, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt, and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

Configuration 19

The device according to any one of Configurations 1 to 13, wherein
the magnetic element includes
a first magnetic layer provided between the first magnetic pole and the second magnetic pole, a second magnetic layer provided between the first magnetic layer and the second magnetic pole, and
a third magnetic layer provided between the second magnetic layer and the second magnetic pole,
a first thickness of the first magnetic layer along a first direction from the first magnetic pole to the second magnetic pole is thicker than a third thickness of the third magnetic layer along the first direction, and
a second thickness of the second magnetic layer along the first direction is thicker than the third thickness.

Configuration 20

The device according to Configuration 19, wherein the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer, and
a fourth non-magnetic layer provided between the third magnetic layer and the second magnetic pole,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt, and W,
the third non-magnetic layer includes at least one selected from the group consisting of Cu, Au, Cr, V, Al and Ag, and
the fourth non-magnetic layer includes at least one selected from the group consisting of Ru, Ir, Ta, Rh, Pd, Pt, and W.

Configuration 21

A magnetic recording device, comprising:
a magnetic head including
a first magnetic pole,
a second magnetic pole,
a magnetic element provided between the first magnetic pole and the second magnetic pole,
a first terminal electrically connected to one end of the magnetic element,
a second terminal electrically connected to another end of the magnetic element,
a coil; and
a controller electrically connected to the magnetic element and the coil,
the controller being configured to perform a recording operation,
in the recording operation, the controller being configured to supply a recording current to the coil while applying an element voltage between the first terminal and the second terminal,
an alternating magnetic field being generated from the magnetic element in the recording operation,
wherein
when an applied voltage applied between the first terminal and the second terminal while the recording current is supplied to the coil is the element voltage, a frequency component of a signal obtained from the magnetic element includes a first frequency peak of the first frequency, and the frequency component does not include a second frequency peak of a second frequency higher than the first frequency, or a ratio of a height of the second frequency peak to a height of the first frequency peak is 0.1 or less.

Configuration 22

The device according to Configuration 21, wherein the frequency component includes the second frequency peak when the applied voltage is higher than the element voltage.

According to the embodiment, a magnetic head and a magnetic recording device can be provided in which the recording density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A magnetic recording device, comprising:
a magnetic head including
a first magnetic pole,
a second magnetic pole,
a magnetic element provided between the first magnetic pole and the second magnetic pole,
a first terminal electrically connected to one end of the magnetic element,
a second terminal electrically connected to another end of the magnetic element,
a coil; and
a controller electrically connected to the magnetic element and the coil,
the controller being configured to perform a recording operation, in the recording operation, the controller being configured to supply a recording current to the coil while applying an element voltage between the first terminal and the second terminal, wherein when an applied voltage applied between the first terminal and the second terminal is changed while the recording current is supplied to the coil, a differential resistance of the magnetic element becomes a first differential resistance peak when the applied voltage is a first voltage, the differential resistance becomes a second differential resistance peak when the applied voltage is a second voltage, the second voltage being higher than the first voltage, and the element voltage being higher than the first voltage and lower than the second voltage.

2. The device according to claim 1, wherein an alternating magnetic field is generated from the magnetic element in the recoding operation, when the applied voltage is higher than a first voltage and lower than a second voltage, the alternating magnetic field is generated from the magnetic element, and the alternating magnetic field is not generated from the magnetic element when the applied voltage is lower than the first voltage.

3. The device according to claim 1, wherein an alternating magnetic field is generated from the magnetic element in the recording operation, a frequency of the alternating magnetic field is not less than 10 GHz and not more than 40 GHz.

4. The device according to claim 1, wherein in the recording operation, a potential of the first magnetic pole is higher than a potential of the second magnetic pole.

5. The device according to claim 1, wherein an alternating magnetic field is generated from the magnetic element in the recording operation, in the recording operation, an element current in an orientation from the first magnetic pole to the second magnetic pole flows to the magnetic element, and when a current from the second magnetic pole to the first magnetic pole flows to the magnetic element while the recording current is supplied to the coil, the alternating magnetic field is not generated from the magnetic element.

6. The device according to claim 1, wherein when the applied voltage applied between the first terminal and the second terminal while the recording current is supplied to the coil is higher than the second voltage, a frequency component of a signal obtained from the magnetic element includes a first frequency peak of a first frequency and a second frequency peak of a second frequency higher than the first frequency, and when the applied voltage applied between the first terminal and the second terminal while the recording current is supplied to the coil is the element voltage, the frequency component includes the first frequency peak and does not include the second frequency peak, or a ratio of a height of the second frequency peak to a height of the first frequency peak is 0.1 or less.

7. A magnetic recording device, comprising:

a magnetic head including a first magnetic pole, a second magnetic pole, a magnetic element provided between the first magnetic pole and the second magnetic pole, a first terminal electrically connected to one end of the magnetic element, a second terminal electrically connected to another end of the magnetic element, a coil; and a controller electrically connected to the magnetic element and the coil, the controller being configured to perform a recording operation, in the recording operation, the controller being configured to supply a recording current to the coil while applying an element voltage between the first terminal and the second terminal, wherein when an applied voltage applied between the first terminal and the second terminal while the recording current is supplied to the coil is higher than a first applied voltage, a frequency component of a signal obtained from the magnetic element includes a first frequency peak of a first frequency and a second frequency peak of a second frequency higher than the first frequency, and when the applied voltage applied between the first terminal and the second terminal while the recording current is supplied to the coil is the element voltage, the frequency component includes the first frequency peak and does not include the second frequency peak, or a ratio of a height of the second frequency peak to a height of the first frequency peak is 0.1 or less.

8. A magnetic recording device, comprising:

a magnetic head including a first magnetic pole, a second magnetic pole, a magnetic element provided between the first magnetic pole and the second magnetic pole, a first terminal electrically connected to one end of the magnetic element, a second terminal electrically connected to another end of the magnetic element, a coil; and a controller electrically connected to the magnetic element and the coil, the controller being configured to perform a recording operation, in the recording operation, the controller being configured to supply a recording current to the coil while applying an element voltage between the first terminal and the second terminal, wherein a differential resistance of the magnetic element when an applied voltage applied between the first terminal and the second terminal is changed while the recording current is supplied to the coil becomes a first differential resistance peak when the applied voltage is a first voltage, and the element voltage is higher than the first voltage and less than 5.4 times the first voltage.

9. The device according to claim 8, wherein the element voltage is 5 times or less of the first voltage.

10. The device according to claim 8, wherein an alternating magnetic field is generated from the magnetic element in the recording operation, when the applied voltage is higher than the first voltage, the alternating magnetic field is generated from the magnetic element, and the alternating magnetic field is not generated from the magnetic element when the applied voltage is lower than the first voltage.

11. The device according to claim 8, wherein
an alternating magnetic field is generated from the magnetic element in the recording operation, and
a frequency of the alternating magnetic field is not less than 10 GHz and not more than 40 GHz.

12. The device according to claim 8, wherein in the recording operation, a potential of the first magnetic pole is higher than a potential of the second magnetic pole.

13. The device according to claim 8, wherein
an alternating magnetic field is generated from the magnetic element in the recording operation,
in the recording operation, an element current in an orientation from the first magnetic pole to the second magnetic pole flows to the magnetic element, and
when a current from the second magnetic pole to the first magnetic pole flows to the magnetic element while the recording current is supplied to the coil, the alternating magnetic field is not generated from the magnetic element.

14. The device according to claim 1, wherein
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole,
a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and
a third thickness of the third magnetic layer along the first direction is thicker than the second thickness and thicker than the fourth thickness.

15. The device according to claim 14, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt, and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

16. The device according to claim 14, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt, and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

17. The device according to claim 1, wherein
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole,
a first thickness of the first magnetic layer along a first direction from the first magnetic pole to the second magnetic pole is thicker than a second thickness of the second magnetic layer along the first direction and thicker than a third thickness of the third magnetic layer along the first direction, and
a fourth thickness of the fourth magnetic layer along the first direction is thicker than the second thickness and thicker than the third thickness.

18. The device according to claim 17, wherein
the magnetic element includes
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt, and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt, and W.

19. The device according to claim 1, wherein
the magnetic element includes
- a first magnetic layer provided between the first magnetic pole and the second magnetic pole,
- a second magnetic layer provided between the first magnetic layer and the second magnetic pole, and
- a third magnetic layer provided between the second magnetic layer and the second magnetic pole, a first thickness of the first magnetic layer along a first direction from the first magnetic pole to the second magnetic pole is thicker than a third thickness of the third magnetic layer along the first direction, and a second thickness of the second magnetic layer along the first direction is thicker than the third thickness.

20. The device according to claim 19, wherein
the magnetic element includes
- a first non-magnetic layer provided between the first magnetic pole and the first magnetic layer,
- a second non-magnetic layer provided between the first magnetic layer and the second magnetic layer,
- a third non-magnetic layer provided between the second magnetic layer and the third magnetic layer, and
- a fourth non-magnetic layer provided between the third magnetic layer and the second magnetic pole, the first non-magnetic layer includes at least one selected from the group consisting of Cu, Au, Cr, V, Al and Ag, the second non-magnetic layer includes at least one selected from the group consisting of Ru, Ir, Ta, Rh, Pd, Pt, and W, the third non-magnetic layer includes at least one selected from the group consisting of Cu, Au, Cr, V, Al and Ag, and the fourth non-magnetic layer includes at least one selected from the group consisting of Ru, Ir, Ta, Rh, Pd, Pt, and W.

* * * * *